United States Patent [19]
Schlafly

[11] Patent Number: 5,471,612
[45] Date of Patent: Nov. 28, 1995

[54] ELECTRONIC SPREADSHEET SYSTEM AND METHODS FOR COMPILING A FORMULA STORED IN A SPREADSHEET INTO NATIVE MACHINE CODE FOR EXECUTION BY A FLOATING-POINT UNIT UPON SPREADSHEET RECALCULATION

[75] Inventor: Roger Schlafly, Soquel, Calif.

[73] Assignee: Borland International, Inc., Scotts Valley, Calif.

[21] Appl. No.: 205,922

[22] Filed: Mar. 3, 1994

[51] Int. Cl.$^6$ .................................................. G06F 17/30
[52] U.S. Cl. .................... 395/600; 395/700; 364/974; 364/973; 364/DIG. 2
[58] Field of Search ...................... 395/600, 700

[56] References Cited

U.S. PATENT DOCUMENTS

| | | | |
|---|---|---|---|
| 4,912,657 | 3/1990 | Saxton et al. ............................ | 395/155 |
| 5,293,615 | 3/1994 | Amada ..................................... | 395/600 |

FOREIGN PATENT DOCUMENTS

| | | | |
|---|---|---|---|
| 0527622A2 | 2/1993 | European Pat. Off. ........ | G06F 15/31 |

OTHER PUBLICATIONS

Hassinen, Kari et al. "Structured Spreadsheet Calculation" IEEE Languages for Automation Workshop, pp. 129–133, 1988.

*Primary Examiner*—Thomas G. Black
*Assistant Examiner*—Peter Y. Wang
*Attorney, Agent, or Firm*—John A. Smart; Vernon A. Norviel

[57] ABSTRACT

An electronic spreadsheet system of the present invention includes a Formula Evaluator having a preferred interface and methods for compiling spreadsheet formulas into native machine language for a target processor/coprocessor. Methods are provided for improved cell lookups, whereby a system memory address for a cell record may be compiled directly into the machine language sequence for a compiled formula. Additional methods are provided for simplifying error checking. The methods adapt NaN (IEEE format) values for encoding spreadsheet ERR and NA values, so that the on-chip logic of the coprocessor may be employed for correctly propagating ERR and NA values. Preferred auditing methodology is also described, which includes further modifying the format of NaN values so that a NaN encoding an ERR or NA also embeds the address of the originating cell (i.e., the first cell which first gave rise to the ERR or NA value).

32 Claims, 18 Drawing Sheets

*IEEE FORMAT*

*REGISTER STRUCTURE
OF INTEL-COMPATIBLE
COPROCESSORS*

|   | A | B | C | D | E | F | G | H |
|---|---|---|---|---|---|---|---|---|
|   |   | Jan | Feb | Mar | Apr | May | Jun | Total |
| 2 | Jump Start | NA | 1,830 | 2,233 | 2,724 | 3,323 | 4,054 | NA |
| 3 | Thin Fizz | 900 | 1,008 | 1,129 | 1,264 | 1,416 | 1,585 | 7,302 |
| 4 | Crystal Fuzz | 750 | 818 | 891 | 971 | 1,059 | 1,154 | 5,643 |
| 5 | Total | NA | 3,656 | 4,253 | 4,959 | 5,798 | 6,793 | NA |

"QUIET NaN"
ENCODING FORMAT
FOR
SPREADSHEET "NA" AND "ERR"
(WITH CELL ADDRESS PROPAGATION)

80-BIT IEEE TREAL FORMAT:

EXPONENT: ALL 1s        MANTISSA: NON-ZERO (i.e., AT LEAST ONE 1)

```
79 78        64 63                                    0
 0 1111111111111 1XXXYYYYYYYYYYYYYYYYYYYYYYYYYYYYYYYYY......
                    └─┬─┘└──────────────┬──────────────┘
                     ERR          48-BIT ENCODED ADDRESS
                     OR           OF ORIGINATING CELL
                     NA           (FOR PROPAGATING CELL ADDRESS)
                   (ERR>NA)
```

---

64-BIT IEEE DOUBLE FORMAT:

```
63 62         52 51                                   0
 0 11111111111 XXXYYYYYYYYYYYYYYYYYYYYYYYYYYYYYYYYYYYYY.
```

NA (W/O ADDR):
0111 1111 1111 1010   + "DON'T CARE"
 7    F    F    A

NA (W/ ADDR):
0111 1111 1111 1011   + CELL ADDRESS
 7    F    F    B

ERR (W/O ADDR):
0111 1111 1111 1100   + "DON'T CARE"
 7    F    F    C

ERR (W/ ADDR):
0111 1111 1111 1101   + CELL ADDRESS
 7    F    F    D (E, F)

FIG. 4C

EVALUATION OF FORMULA FOR CELL B6 -- @SUM(B3..B5):

*(1) LOAD VALUE STORED IN CELL B3 (i.e., NA):*

| ST: | 0 | 1111111111111 | 1:011:0000000001000000000000000000000010:...... | [NA, B3] |

NA BITS 451 — ADDRESS BITS 453

ST(1): ...

*(2) LOAD VALUE STORED IN CELL B4 (i.e., 900):*

| ST: | 0 | 100000000001000 | 11100001000000000000000000000000000000000000000000...... | [900] |
| ST(1): | 0 | 1111111111111 | 1:011:000000000100000000000000000000000010...... | [NA, B3] |

...

*(3) ADD THE TWO VALUES -- FADD ST,ST(1):*

| ST: | 0 | 1111111111111 | 1011000000000100000000000000000000000010...... | [NA, B3] |
| ST(1): | 0 | 1111111111111 | 1011000000000100000000000000000000000010...... | [NA, B3] |

...

*(4) LOAD VALUE STORED IN CELL B5 (i.e., 750):*

| ST: | 0 | 100000000001000 | 101110110000000000000000000000000000000000000000...... | [750] |
| ST(1): | 0 | 1111111111111 | 1011000000000100000000000000000000000010...... | [NA, B3] |

...

*(5) ADD THE TWO VALUES -- FADD ST,ST(1):*

| ST: | 0 | 1111111111111 | 1011000000000100000000000000000000000010...... | [NA, B3] |
| ST(1): | 0 | 1111111111111 | 1011000000000100000000000000000000000010...... | [NA, B3] |

EVALUATION OF FORMULA FOR CELL D6 -- @SUM(D3..D5):

*(1) LOAD VALUE STORED IN CELL D3 (i.e., ERR):*

ST: | 0 | 1111111111111111 | 1:1:1100000000000100000000000000010000000110000000000000010........ | [ERR, D3]
ST(1): | | | |

ERR BITS 461 — ADDRESS BITS 463

*(2) LOAD VALUE STORED IN CELL D4 (i.e., 1129):*

ST: | 0 | 10000000000001001 | 1000110101001000000000000000000000000000100000000000000000000000........ | [1129]
ST(1): | 0 | 1111111111111111 | 1111100000000000000000000000000000000000100000000000000000000010........ | [ERR, D3]

*(3) ADD THE TWO VALUES -- FADD ST,ST(1):*

ST: | 0 | 1111111111111111 | 1111100000000000000000000000000000000000100000000000000000000010........ | [ERR, D3]
ST(1): | 0 | 1111111111111111 | 1111100000000000000000000000000000000000100000000000000000000010........ | [ERR, D3]

*(4) LOAD VALUE STORED IN CELL D5 (i.e., 894):*

ST: | 0 | 10000000000001000 | 1101111011000000000000000000000000000000100000000000000000000000........ | [894]
ST(1): | 0 | 1111111111111111 | 1111100000000000000000000000000000000000100000000000000000000010........ | [ERR, D3]

*(5) ADD THE TWO VALUES -- FADD ST,ST(1):*

ST: | 0 | 1111111111111111 | 1111100000000000000000000000000000000000100000000000000000000010........ | [ERR, D3]
ST(1): | 0 | 1111111111111111 | 1111100000000000000000000000000000000000100000000000000000000010........ | [ERR, D3]

FIG. 4E

EVALUATE FORMULA OF CELL H3:

STEP 1 — PUSH CELL B3 VALUE

| | |
|---|---|
| ST | [NA, B3] |
| ST(1) | ... |
| ST(2) | |
| ST(3) | |
| ST(4) | |
| ST(5) | |
| ST(6) | |
| ST(7) | |

STEP 2 — PUSH CELL C3 VALUE

| | |
|---|---|
| ST | [1830] |
| ST(1) | [NA, B3] |
| ST(2) | ... |
| ST(3) | |
| ST(4) | |
| ST(5) | |
| ST(6) | |
| ST(7) | |

STEP 3 — ADD: FADD ST,ST(1)

| | |
|---|---|
| ST | [NA, B3] |
| ST(1) | ... |
| ST(2) | |
| ST(3) | |
| ST(4) | |
| ST(5) | |
| ST(6) | |
| ST(7) | |

STEP 4 — PUSH CELL D3 VALUE

| | |
|---|---|
| ST | [ERR, D3] |
| ST(1) | [NA, B3] |
| ST(2) | ... |
| ST(3) | |
| ST(4) | |
| ST(5) | |
| ST(6) | |
| ST(7) | |

STEP 5 — ADD: FADD ST,ST(1)

| | |
|---|---|
| ST | [ERR, D3] |
| ST(1) | ... |
| ST(2) | |
| ST(3) | |
| ST(4) | |
| ST(5) | |
| ST(6) | |
| ST(7) | |

STEP 6 — PUSH CELL E3 VALUE

| | |
|---|---|
| ST | [2724] |
| ST(1) | [ERR, D3] |
| ST(2) | ... |
| ST(3) | |
| ST(4) | |
| ST(5) | |
| ST(6) | |
| ST(7) | |

... = "DON'T CARE"

*FIG. 5A*

| | A | B | C | D | E | F | G | H | I |
|---|---|---|---|---|---|---|---|---|---|
| 1 | | Jan | Feb | Mar | Apr | May | Jun | Total | |
| 2 | Jump Start | NA<A:B3> | 1,830 | ERR<A:D3> | 2,724 | 3,323 | 4,054 | ERR<A:D3> | |
| 3 | Thin Fizz | 900 | 1,008 | 1,129 | 1,264 | 1,416 | 1,585 | 7,302 | |
| 4 | Crystal Fuzz | 750 | 818 | 891 | 971 | 1,059 | 1,154 | 5,643 | |
| 5 | Total | NA<A:B3> | 3,656 | ERR<A:D3> | 4,959 | 5,798 | 6,793 | ERR<A:D3> | 410d |

FIG. 6B

COMPILE THE FORMULA STORED IN B1: +C3 *F4 / 900

IN-MEMORY LAYOUT (CODE SEGMENT): ─ 801

```
                NEAR LIBRARY (HELPER FUNCTIONS)
:0000           PUSH_VALUE:

STORE_AND_EXIT:
```

COMPILED FORMULA₁ ─ 811 ─ 810

```
                DATA (CELL LOOKUPS AND STATIC DATA)
:0261   2DDF:FB3E   (Stores pointer to Cell C3)
:0265   2DDF:FC3C   (Stores pointer to Cell F4)
:0269   0x0384      (Stores 900)
:026B   2DDF:3420   (Stores pointer to B1 Formula Result)
```

─ 813

```
                COMPILED CODE (MACHINE CODE SEQUENCE)
:026F   MOV BX, 0261        ; LOAD PTR TO C3's RECORD
        CALL PUSH_VALUE     ; CALL PUSH_VALUE
        MOV BX, 0265        ; LOAD PTR TO F4's RECORD
        CALL PUSH_VALUE     ; CALL PUSH_VALUE
        FMULT ST(1), ST     ; MULTIPLY [C3] * [F4]
        MOV BX, 0269        ; LOAD ADDR OF CONSTANT (900)
        FILD CS:WORD PTR[BX] ; LOAD 900 ON T.O.S.
        FDIVP ST(1), ST     ; DIVIDE ([C3] * [F4]) BY 900
        MOV BX, 026B        ; LOAD PTR TO B1 FORMULA RESULT
        JMP STORE_AND_EXIT  ; STORE RESULT TO B1 AND EXIT
```

COMPILED FORMULA₂

.
.
.

COMPILED FORMULAₓ

*FIG. 8*

ELECTRONIC SPREADSHEET SYSTEM AND METHODS FOR COMPILING A FORMULA STORED IN A SPREADSHEET INTO NATIVE MACHINE CODE FOR EXECUTION BY A FLOATING-POINT UNIT UPON SPREADSHEET RECALCULATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of information processing by digital computers and, more particularly, to the processing and presentation of information by application programs, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to error. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visual calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the data stored in spreadsheet cells. In this fashion, cell references can serve as variables in an equation, thereby allowing precise mathematical relationships to be defined between cells.

A particular advantage of electronic spreadsheets is the ability to create a multitude of "what if" scenarios from a single data model. This ability stems largely from the spreadsheet formulas, which are the means by which a user tells an electronic spreadsheet system how to manipulate and analyze one's data. After a set of mathematical relationships has been entered into a worksheet, the spread of information can be "recalculated" using different sets of assumptions, with the results of each recalculation appearing relatively quick. Performing this operation manually, with paper and pencil, would require recalculating every relationship in the model with each change made. Expectedly, electronic spreadsheets have quickly displaced their pencil-and-paper counterparts for modeling user information.

The structure and operation of a spreadsheet program, including spreadsheet formulas and "macros," are documented in the technical, trade, and patent literature. For an overview, see e.g., Cobb, D., *Using 1-2-3*, Que Corp., 1985; and Campbell, M., *Quattro Pro 4.0 Handbook,* 4th Ed., 1992. The disclosures of each of the foregoing references are hereby incorporated by reference.

Spreadsheet formulas are fundamental to the creation and operation of a spreadsheet data model. During creation of a particular spreadsheet or worksheet model, a user enters formulas in worksheet cells the same way he or she enters values and labels. Typically, a formula begins with a number or with a special character (e.g., +, −, (, @, ., #, or $) to distinguish the entry from raw data. More particularly, formulas are constructed from one or more of four basic components: operators, values, cell references, and @-functions. Each of these will be briefly reviewed.

Operators, which indicate how user data are to be combined and manipulated, typically include well-known operators such as −, +, *, /, and the like. Values are the information (e.g., numeric, logical, or text) which formulas are to act upon. To include a value in a formula, the user simply types it as he or she desires it to appear.

Cell references, on the other hand, allow a user to employ a value in one's current formula that is derived from another cell. For instance, if a cell having an address of B3 contains the value of 10, the formula 5+B3 placed in any other cell of the spreadsheet will evaluate to the result of 15. A referenced cell containing no value (blank) or a label is, depending on implementation, treated as zero or as an error (ERR). Much of the flexibility of electronic spreadsheets stems from this ability to establish relationships via cell references.

The @-functions are built-in formulas provided for frequently-used calculations. Some @-functions perform a calculation on a single value, such as @SQRT(n) which calculates the square root of the number n. Other @-functions perform calculations on cell ranges, such as @SUM(B3 . . . B10) which sums the values stored in cells B3 to B10. @-functions can be used in formulas where one might use a value or cell reference.

Before meaningful results of a given spreadsheet may be presented to a user, the formulas of a given spreadsheet must first be evaluated or recalculated. "Recalculation" is the process by which a spreadsheet's cells, particularly formula-storing ones, are evaluated to express values. Different recalculation orders are well known including, for instance, natural, rowwise, and columnwise. Each will be reviewed in turn.

Natural recalculation entails evaluating the least dependent cells first. In other words, the spreadsheet system first recalculates those cells upon which the formulas and functions in other cells depend. Suppose, for example, that one desires to create a business forecast (data model) with the following assumptions: (1) Cost of goods is 30% of revenue, (2) Advertising expenses are $5,000, and (3) Taxes are 28% of pre-tax profit. This may be modeled in a spreadsheet model having the following cell entries:

| Cell | Formula | Comment |
| --- | --- | --- |
| B3 | 0.3 * B2 | Cost of goods - calculated as 30% of B2 (Revenue stored in B2) |
| B4 | 5000 | Advertising expense |
| B5 | +B2−B3−B4 | Pre-tax profit |
| B6 | 0.28 * B5 | Taxes due - calculated as 28% of B5 (Pre-tax profit) |
| B7 | +B5−B6 | Net profit is B5 (pre-tax profit) less B6 (taxes) |

Now, the user may quickly forecast a net profit (value expressed in cell B7) for a given revenue value (entered into cell B2). A multitude of revenue values may be forecasted by simply entering different values into B2.

Interdependencies between the cells dictate how a spreadsheet system actually performs recalculation. Before a value for cell B7 may be calculated, for instance, the value for cell B5 (and for cell B6) must be known. Before B5 can be calculated, a value for cell B3 (and cells B2 and B4) must be known. Cell B2 must be evaluated before a value for B3 can be expressed. Because natural recalculation recognizes these interdependencies, it is a recalculation method commonly employed in conventional electronic spreadsheets.

Rowwise recalculation, in contrast, moves across each row from the left-most cell to the right-most cell, beginning with the top-most row in the model and working to the bottom-most. Columnwise recalculation moves from the top-most cell to the bottom-most cell in a column, starting with the left-most column and moving to the right-most. Since the rowwise and columnwise recalculation methods typically do not recognize the interdependencies between cell values, multiple recalculation passes may be required to produce a recalculated spreadsheet.

Regardless of which recalculation order is employed, the quickness or "speed" with which recalculation can be completed is often used as an indicator of the overall performance of an electronic spreadsheet. A slow recalculation time for a spreadsheet system ensures that the user will waste time waiting for the system to complete its recalculation. Quick recalculation, on the other hand, allows the user to complete his or her task with minimum interruption. Accordingly, electronic spreadsheets which perform recalculations quickly enjoy greater commercial success.

With the present trend of employing electronic spreadsheets to model increasingly complex data models, the ability of present-day electronic spreadsheet systems to quickly evaluate models has become taxed. For instance, it is not uncommon for a financial model of even modest complexity to have a recalculation time on the order of several minutes. While improved computer hardware, including more efficient floating-point processors and faster clock speeds, has helped, many users of electronic spreadsheets still spend a significant portion of their time waiting idly while their spreadsheets are being recalculated. Accordingly, there is much interest in improving the speed with which electronic spreadsheets perform recalculation of spreadsheets.

SUMMARY OF THE INVENTION

The present invention comprises an electronic spreadsheet system having a preferred interface and methods for compiling spreadsheet formulas into native machine instructions. The system includes a Formula Evaluator for compiling a given spreadsheet formula into a machine language sequence to be executed by the target processor/coprocessor. In this manner, the system may perform recalculation of spreadsheet formulas in substantially less time than is required by prior art, token-based interpreter systems.

In an exemplary embodiment, the system of the present invention comprises the Formula Evaluator operating in conjunction with a stack-oriented floating-point unit (FPU) or "math coprocessor" which is compliant with the IEEE Floating-point standard (IEEE-754, Standard for Binary Floating-point Arithmetic). Besides evaluating expressions in a Reverse-Polish Notation (RPN) or postfix format, such coprocessors include internal formats for representing positive and negative infinity, and NaNs (Not a Number). These internal representations are adapted by the Formula Evaluator for representing standard spreadsheet ERR (error) and NA (not available) values.

To make compilation of formulas feasible, the system includes improved methodology for cell record lookups (i.e., resolving cell addresses for retrieving cell values). Since a math coprocessor loads operands from and stores results to system memory, machine language for the coprocessor must include actual system memory addresses (not cell identifiers). The present invention recognizes that at runtime allocated memory blocks for cell information typically are fixed (i.e., will not be moved to a new location). This aspect is exploited to improve cell lookups as follows. Formulas are compiled to native machine code on the first recalculation operation of a spreadsheet, typically when a spreadsheet is first loaded. Since the formulas are compiled after the cell records have been loaded into system memory, the various cell addresses in formulas may be resolved to actual addresses in system memory for the user session. In this manner, the actual address for a cell (i.e., system memory address for the cell result stored in the in-memory cell record) may be compiled directly into the machine language sequence for the spreadsheet formula.

The Formula Evaluator of the present invention also includes improved error checking facilities, thereby eliminating the need for incorporating numerous checks in compiled formulas. Specifically, operation of the coprocessor is adapted to provide native support for spreadsheet ERR and NA values, thus ensuring their proper propagation. Specifically, NaN (IEEE format) values are employed for representing spreadsheet ERR and NA values. Since adding a NaN (e.g., one representing an ERR or NA value) to a non-NaN yields a NaN with an unchanged mantissa bit pattern (i.e., preserving it as an ERR or NA), the math coprocessor's rules for propagating NaNs may be employed for correctly propagating spreadsheet ERR and NA values. Moreover, by defining ERR to have a larger mantissa bit pattern than NA, the on-chip logic of the coprocessor may be employed to correctly propagate ERR over NA (thus satisfying standard spreadsheet rules for propagating ERR and NA values).

In the system of the present invention, NaNs are further modified to encode cell addresses, for tracking first instances of ERR and NA values. Specifically, particular bits of the mantissa are used to encode a unique cell identifier—one which is directly translatable into a particular cell address. In an exemplary embodiment, 48 bits are employed for encoding a notebook, page, row, and column for a cell. Thus as the NaN (representing ERR or NA) propagates, the address of the originating cell also propagates to all destination cells.

The present invention also includes a preferred interface having an audit mode whereby the ERR or NA-propagated address is displayed at all destination cells. In this manner, the system allows the user to immediately view a source of error. As a result, the user no longer needs to expend effort tracing through a multitude of formulas for tracking down the source of an ERR or NA value.

BRIEF DESCRIPTION OF THE DRAWINGS

FIG. 4A is a screen bitmap illustrating occurrence of a spreadsheet NA ("not available") value in the spreadsheet of FIG. 2A.

FIG. 4B is a screen bitmap illustrating occurrence of a spreadsheet ERR ("error") value in the spreadsheet of FIG. 2A.

FIG. 4C is a block diagram illustrating a method of the present invention for encoding spreadsheet NA and ERR values (and originating cell address) an NaN (Not a Number) values in IEEE 80-bit TReal format and IEEE 64-bit double format.

FIG. 4D is a block diagram illustrating register processing of an NA-encoded NaN in a stack-oriented math coprocessor.

FIG. 4E is a block diagram illustrating register processing of an ERR-encoded NaN in a stack-oriented math coprocessor.

FIGS. 5A–B are block diagrams illustrating register processing of an ERR-encoded NaN together with an NA-encoded NaN in a stack-oriented math coprocessor.

FIGS. 6A–B are screen bitmaps illustrating an interface for dynamically auditing spreadsheets.

FIG. 8 is a block diagram illustrating in-memory layout for a formula compiled in accordance with the present invention.

DETAILED DESCRIPTION OF A PREFERRED EMBODIMENT

The following description will focus on the presently preferred embodiments of the present invention, which are embodied in an electronic spreadsheet system operative in an Intel 80×86/80×87-compatible architecture. The present invention, however, is not limited to any particular environment or any particular application. Instead, those skilled in the art will find that the teachings of the present invention may be advantageously applied to a variety of different architectures, including Motorola 68000 series, PowerPC, Mips, and the like. Therefore, the description of the exemplary embodiments which follows is for purposes of illustration and not limitation.

GENERAL SYSTEM

A. Hardware

Figure 1A:
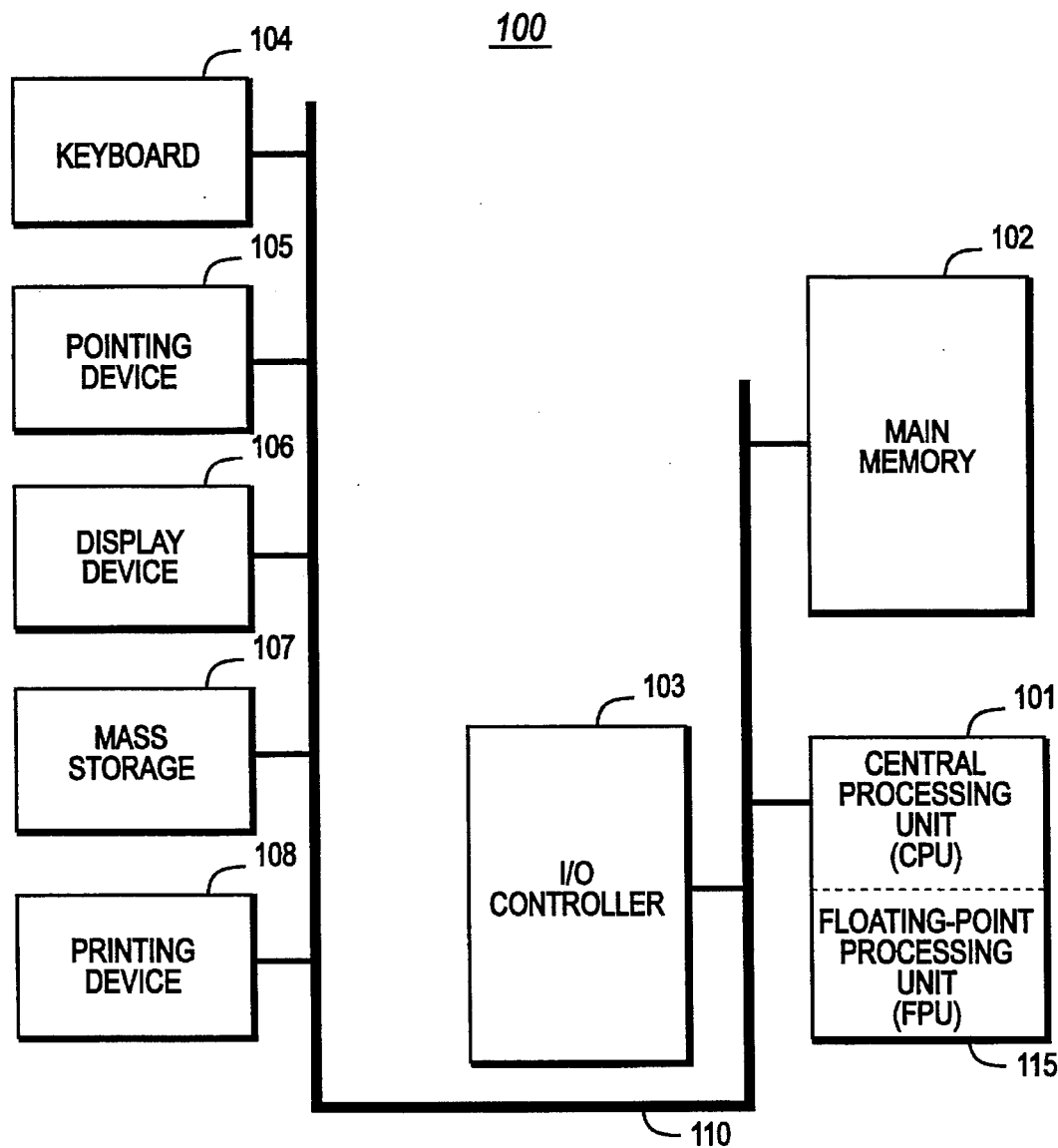
FIG. 1A is a block diagram of a computer system in which the present invention may be embodied.

As shown in FIG. 1A, the present invention may be embodied in a computer system such as the system 100, which includes a central processing unit (CPU) 101, a math coprocessor or floating-point processing unit (FPU) 115, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture.

In a preferred embodiment, the computer system 100 includes an IBM-compatible personal computer, which is available from several vendors (including IBM of Armonk, N.Y.). More particularly, the CPU 101 comprises an Intel 80×86-class microprocessor (e.g., Intel 80386), and the FPU 115 comprises a corresponding Intel 80×87-class math coprocessor (e.g., Intel 80387; both are available from Intel Corporation of Santa Clara, Calif. Compatible microprocessors and coprocessors are available from a variety of vendors, including Advanced Micro Devices (Austin, Tex.) and Cyrix (Richardson, Tex.). Preferably, the CPU 101 includes an on-chip FPU (as shown in FIG. 1A), as is available with an Intel 80486DX-class microprocessor (or later, such as Pentium® class).

B. Software system

1. Overview

Figure 1B:
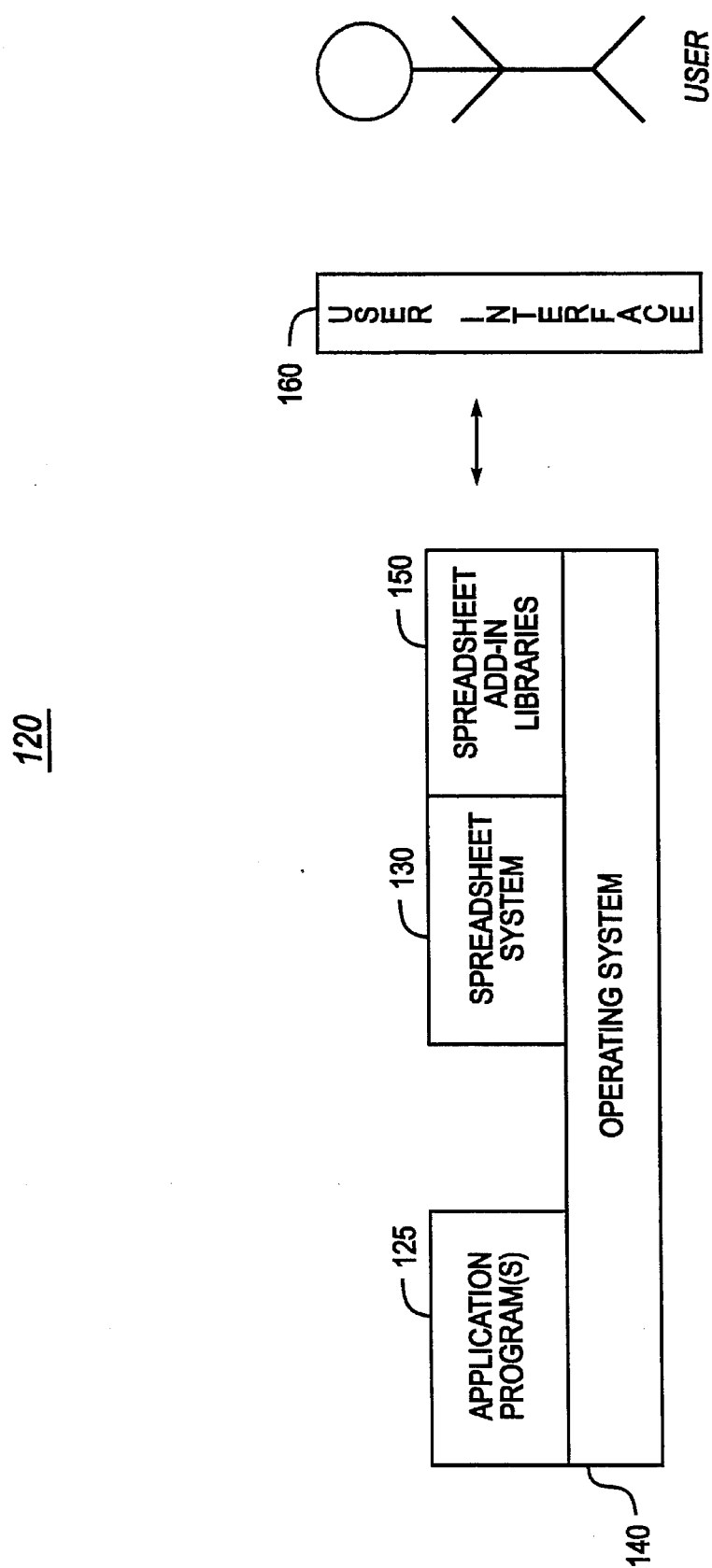
FIG. 1B is a block diagram of a software system of the present invention, which includes operating system, application software, and user interface components.

Illustrated in FIG. 1B, a computer software system 120 is provided for directing the operation of the computer system 100. Software system 120, which is stored in system memory 102 and on disk memory 107, includes a kernel or operating system 140 and an interface 160. One or more application programs, such as application software 125, may be "loaded" (i.e., transferred from storage 107 into memory 102) for execution by the system 100. The system 100 receives user commands and data through user interface 160; these inputs may then be acted upon by the system 100 in accordance with instructions from operating system module 140 and/or application module 125. The interface 160, which may support a character-based and/or preferably a graphical user interface (GUI), also serves to display results, whereupon the user may supply additional inputs or terminate the session. In a preferred embodiment, operating system 140 comprises MS-DOS® operating in conjunction with Microsoft® Windows; both are available from Microsoft of Redmond, Wash. Interface 160, on the other hand, is typically provided by the application programs and spreadsheet system 130, which will now be described.

2. Electronic Spreadsheet

As shown, system 120 also includes a spreadsheet system 130 of the present invention. The spreadsheet system 130 interfaces with the system 100 through the operating system 140. Spreadsheet system 130 may also be operably coupled to one or more spreadsheet add-in libraries 150, which are commercially available.

Figure 1C:
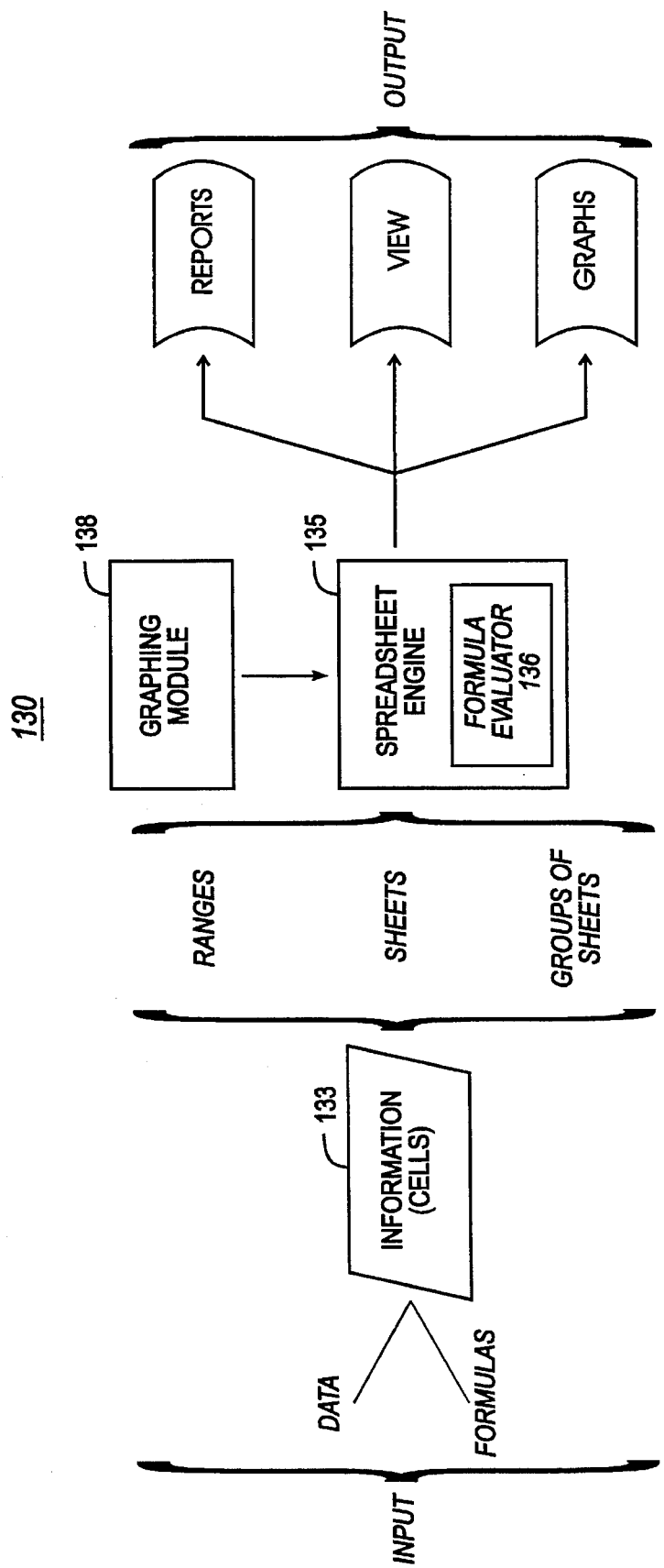
FIG. 1C is a block diagram of an electronic spreadsheet system of the present invention.

The spreadsheet system 130 of the present invention is shown in further detail by a simplified block diagram of FIG. 1C. The system 130 includes a spreadsheet engine or module 135 and a graphing module 138. In operation, the system 130 maintains a matrix or "spread" of information cells 133, each cell being an atomic unit maintained and processed by the module 135. Data and formulas for the cells are received from an input device (e.g., keyboard, mouse, disk, and the like) for storage and processing by the system 130. From the cells, larger groupings, such as ranges (including blocks), sheets (including 2-D spreads), and groups of sheets (including 3-D spreads, linked sheets, and pages of sheets or "notebooks") may be defined. The graphing module 138 provides the system 130 with the capability of displaying the spread of information cells visually, such as in various graphs.

As shown, the spreadsheet engine 135 includes a Formula Evaluator 136 of the present invention. The Formula Evaluator 136 processes the various formulas stored in a spreadsheet during spreadsheet recalculation. Of particular interest are methods of the Formula Evaluator for compiling spreadsheet formulas directly into machine code (for execution by the FPU 115 operating in conjunction with CPU 101). In this manner, the spreadsheet subsystem 130 greatly increases the efficiency with which spreadsheet recalculation may be performed by the system 100. Operation of the Formula Evaluator 136 is described in greater detail hereinbelow.

In a preferred embodiment, the spreadsheet system 130 includes Quattro® Pro for Windows, available from Borland International of Scotts Valley, Calif. A description of the general features and user operation of system 130 is available in the documentation which accompanies Quattro® Pro for Windows.

3. Notebook interface

Figure 2A:
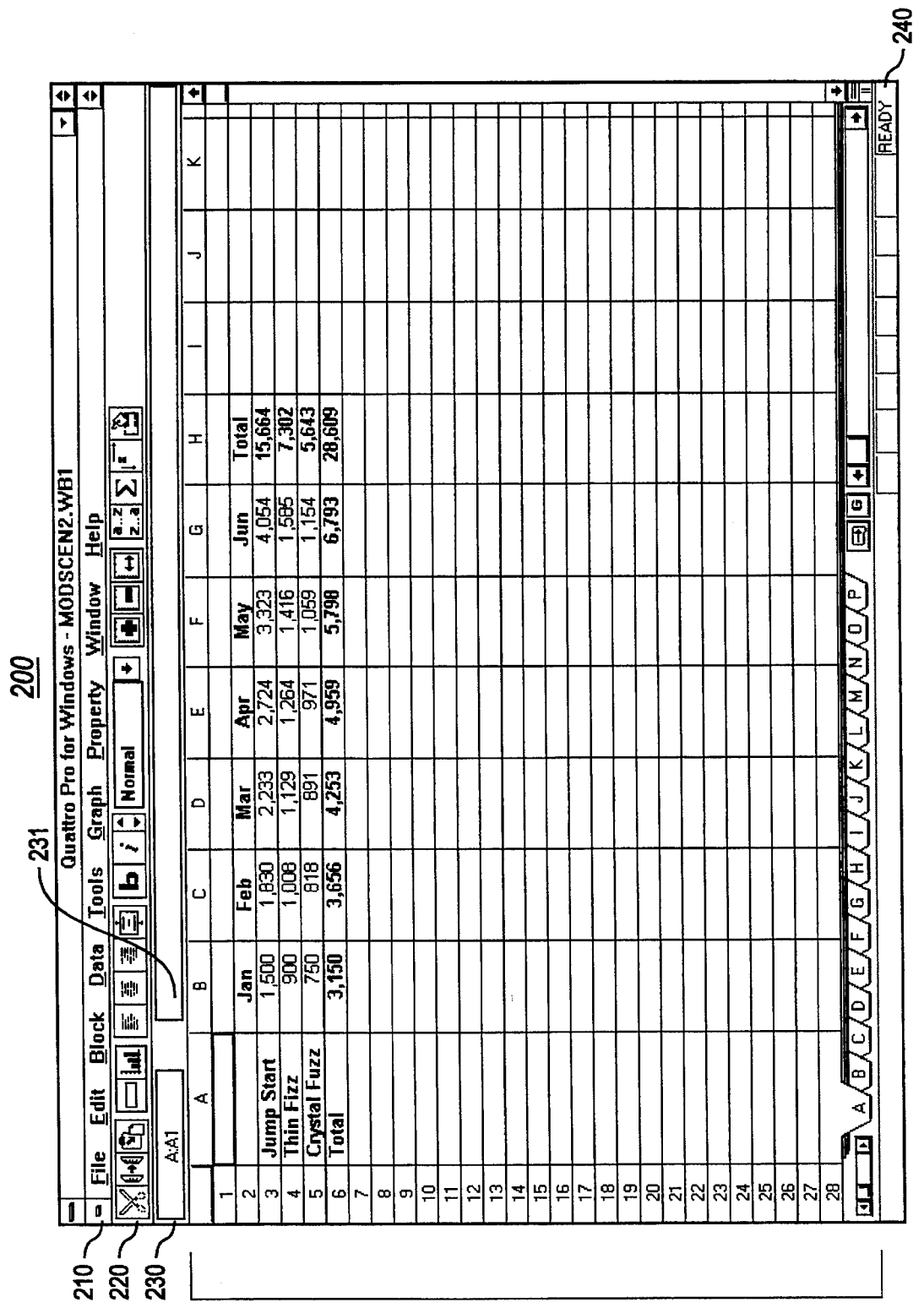
FIG. 2A is a screen bitmap illustrating a spreadsheet notebook interface employed in a preferred embodiment of the present invention; a sample "spreadsheet" has been loaded.

The spreadsheet system 130 includes a preferred notebook interface 200, shown in FIG. 2A, for receiving, processing, and presenting information, including alphanumeric as well as graphic information. Notebook workspace 200 includes a menu bar 210, a toolbar 220, a current cell indicator 230, an input line 231, a status line 240, and a notebook workspace 250. The menu bar 210 displays and invokes, in response to user inputs, a main level of user commands. Menu 210 also invokes additional pulldown submenus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
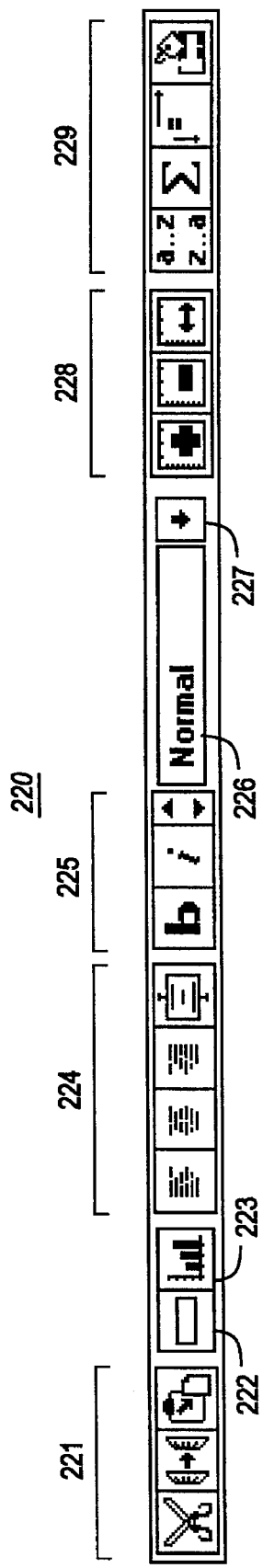
FIG. 2B is a bitmap of a toolbar component of the interface of FIG. 2A.

The toolbar 220, shown in further detail in FIG. 2B, comprises a row or palette of tools which provide a quick way for the user to choose commonly-used menu commands or properties. In an exemplary embodiment, toolbar 220 includes cut, copy, and paste buttons 221, a power button tool 222, a graph tool 223, alignment buttons 224, font buttons 225, a style list 226 with pulldown, insert/delete and fit buttons 227, action (e.g., sort, sum, and the like) buttons 228, and an "expert" (tutor) button 229. The functions of these buttons are suggested by their names. For instance, buttons 221 cut, copy, and paste data and objects to and from Windows' clipboard. Tool 222 creates "powerbuttons" which allow a user to run spreadsheet macros; in a specific embodiment, powerbuttons appear as floating objects in a layer above spreadsheet cells. In a similar fashion, the graph tool 223 creates floating graphs that appear above spreadsheet cells.

The notebook, which provides an interface for entering and displaying information of interest, includes a plurality of spreadsheet pages. Each page, such as page A shown in notebook workspace 250, may include conventional windowing features and operations, such as moving, resizing, and deleting. In a preferred embodiment, the notebook includes 256 spreadsheet pages with one Graphs page, all of which are saved as a single disk file on the mass storage 107. Workspace 200 may display one or more notebooks, each sized and positioned (e.g., tiled, overlapping, and the like) according to user-specified constraints.

Each spreadsheet page, in turn, includes a 2-D matrix of spreadsheet cells, arranged as a rectangular grid comprising columns and rows. At the intersection of a column with a row is a single cell. A cell is a location where the user can enter data, formulas, and the like. Each cell is identified by an address determined by the column and row that contain it; in other words, the letter and number that make up the address are the cell's coordinates. Each column of cells is identified by a letter. Columns are marked with letters A–Z, then AA–AZ, BA–BZ and the like, up to IA–IV in a preferred embodiment. Each row of cells is identified by a number. Rows are marked with numbers ranging from 1 to 8192, in a preferred embodiment. Thus, for example, the cell in the top left corner is cell A1.

A highlighted rectangle or "cell selector" is provided for indicating a currently active one (i.e., the cell that is currently selected). This is the cell that will be affected by the next action, such as entering a value. The column containing the cell selector appears on the border in reverse video (or in a contrasting color on a color screen); the row containing the cell selector appears in reverse video or a contrasting color, depending on the monitor. The user can move the selector to any cell in the spreadsheet.

To enter information in the spreadsheet, the user typically moves the selector to a desired cell (e.g., with a screen cursor 185 or keyboard 102) and types in the entry. The characters typed in appear on the input line. When the entry is complete, the user presses Enter or an arrow key (Right arrow, Left arrow, PgUp, or the like). The system 130 writes the value into the current cell, erasing any previous entry. If the user enters the data by pressing an arrow key, the selector moves in the appropriate direction.

Multiple cells may be selected for aggregate operations. In particular, a cell "block" is defined as a rectangular group of cells identified by the cell addresses of two opposite corners—usually the upper left and bottom right cells. In response to user movement signals from the pointing device 105, the cursor may be "dragged" across a range of cells for selecting a block, as is known in the art. Blocks may include contiguous or adjacent cells or ones which are non-contiguous. Once selected, blocks may be used in commands and formulas to act on several cells at once.

Figure 2C:
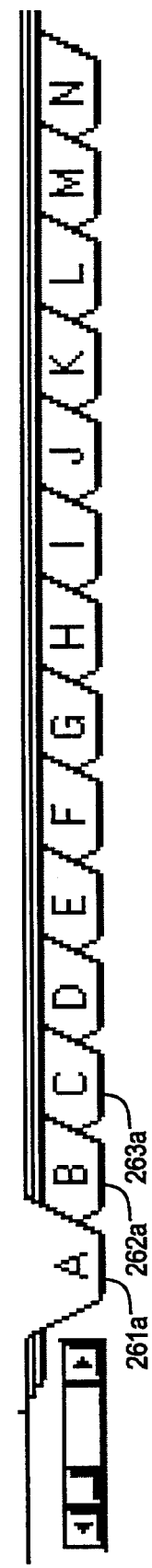
FIGS. 2C–D are bitmaps illustrating page identifiers for rapidly accessing and manipulating individual pages of the notebook interface.
Figure 2D:
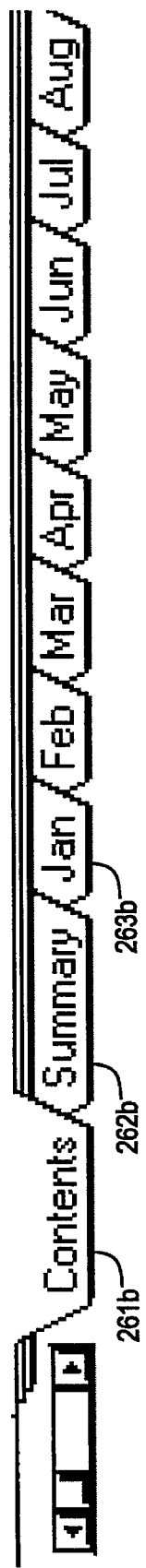

Since a notebook may include a plurality of 2-D spreadsheets or pages, the notebook interface includes an identifier for each page. As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a bottom edge of the notebook. Each tab member may include representative indicia, such as textual or graphic labels, including user-selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: he or she simply selects the tab corresponding to the page (as one would do when selecting a page from a paper notebook).

A general description of the features and operation of the spreadsheet notebook interface may be found in Quattro® Pro for Windows (*Getting Started, User's Guide* and *Building Spreadsheet Applications*), available from Borland International; additional description may be found in U.S. Pat. No. 5,416,895, commonly owned by the present assignee.

NUMERIC PROCESSING

A. Floating-point Processors

Before describing the Formula Evaluator 136 in detail, it is helpful to review the architecture and operation of floating-point processors or "math coprocessors." In this manner, adaptation of the operation of math coprocessors for processing compiled spreadsheet formulas may be understood. Although a variety of floating-point microprocessors are available, the following discussion will focus on Intel's 80×86/80×87 family of microprocessors and coprocessor. Those skilled in the art will appreciate that the teachings of the present invention may be adapted for use with non-Intel architectures as well.

CPU microprocessors of the Intel 80×86 family are fundamentally integer processing units—designed to operate on a variety of integer data types. Integer processing units are ones which offer no direct support for operations on floating-point data types. Given the correct sequence of instructions, an integer processing unit can of course perform operations on any numeric data type, including floating-point ones. However, this "software emulation" of floating-point is not particularly fast, and in fact can be quite slow. Floating-point microprocessors, in contrast, include intrinsic support for floating-point data types and, thus, can substantially reduce the amount of time required to perform floating-point operations.

Each Intel 80×86 microprocessor has a corresponding (optional) floating-point unit or "math coprocessor" with which it is compatible. The Intel 80286 microprocessor, for instance, may operate in conjunction with an Intel 80287 math coprocessor. Similarly, an Intel 80386DX microprocessor can function in tandem with an Intel 80387DX math coprocessor (or even an 80287 math coprocessor). The processor and coprocessor share a cooperative relationship. While the processor fetches and decodes instructions and calculates memory addresses, the coprocessor performs arithmetic operations on floating-point numbers. The instruction set of the coprocessor largely compliments that of the processor, allowing floating-point operations to be integrated into an application program with minimum difficulty. Beginning with the 80486DX line of microprocessors, Intel incorporated both a processor and a coprocessor on the same chip, thus eliminating the need for a separate floating-point unit.

Figure 3A:
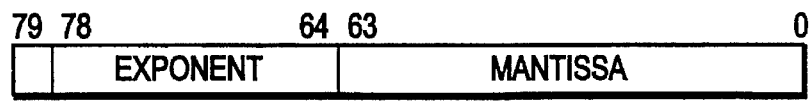
FIG. 3A is a block diagram illustrating the IEEE format for representing floating-point numbers in a computer.

The architecture of the Intel math coprocessors is, to a large extent, dictated by the manner in which floating-point or "real" numbers may be represented in a digital computer. Basically, real numbers are represented internally in a binary floating-point format comprising sign, exponent, and mantissa (fractional part) bit fields, as shown in FIG. 3A. Today, most floating-point processors support the popular IEEE floating-point standard (IEEE-754, Standard for Binary Floating-point Arithmetic). The IEEE standard defines a specific format (actual bit pattern) used to represent floating-point numbers. Single precision (32-bits long), double precision (64-bits long), and extended precision (80-bits long) formats are defined.

Figure 3B:
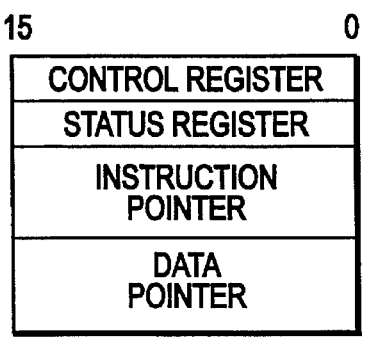
FIG. 3B is a block diagram illustrating register layout for a stack-based math coprocessor, such as found in the Intel 80×87 line of coprocessors.

Internally, the Intel coprocessors use the extended or "temporary real" format for all calculations; all data types read from memory are converted to the temporary real format automatically. Accordingly, specific register architecture of the Intel coprocessors is designed to accommodate the 80-bit temporary real format. As shown in FIG. 3B, the Intel coprocessors include eight 80-bit numeric registers, with each register being functionally divided to include a 1-bit sign field, a 15-bit exponent field, and a 64-bit mantissa field as shown.

Although the registers may be accessed individually, most calculations are accomplished using a stack-oriented approach: a program "pushes" values onto the stack from system memory, performs an operation on the values (e.g., addition, subtraction, multiplication, division, and the like), and "pops" the result from the stack back to system memory. To push values from memory onto the stack, the coprocessor includes an FLD family of instructions. Operands are usually pushed onto the Top of the Stack (TOS). Additional instructions are provided for arithmetic operations, such as FADD for adding two floating-point numbers. An FST family of instructions are provided for copying a value at the top of the stack into another coprocessor register or system memory.

B. Illustration of Stack-based Operation

Figure 3C:
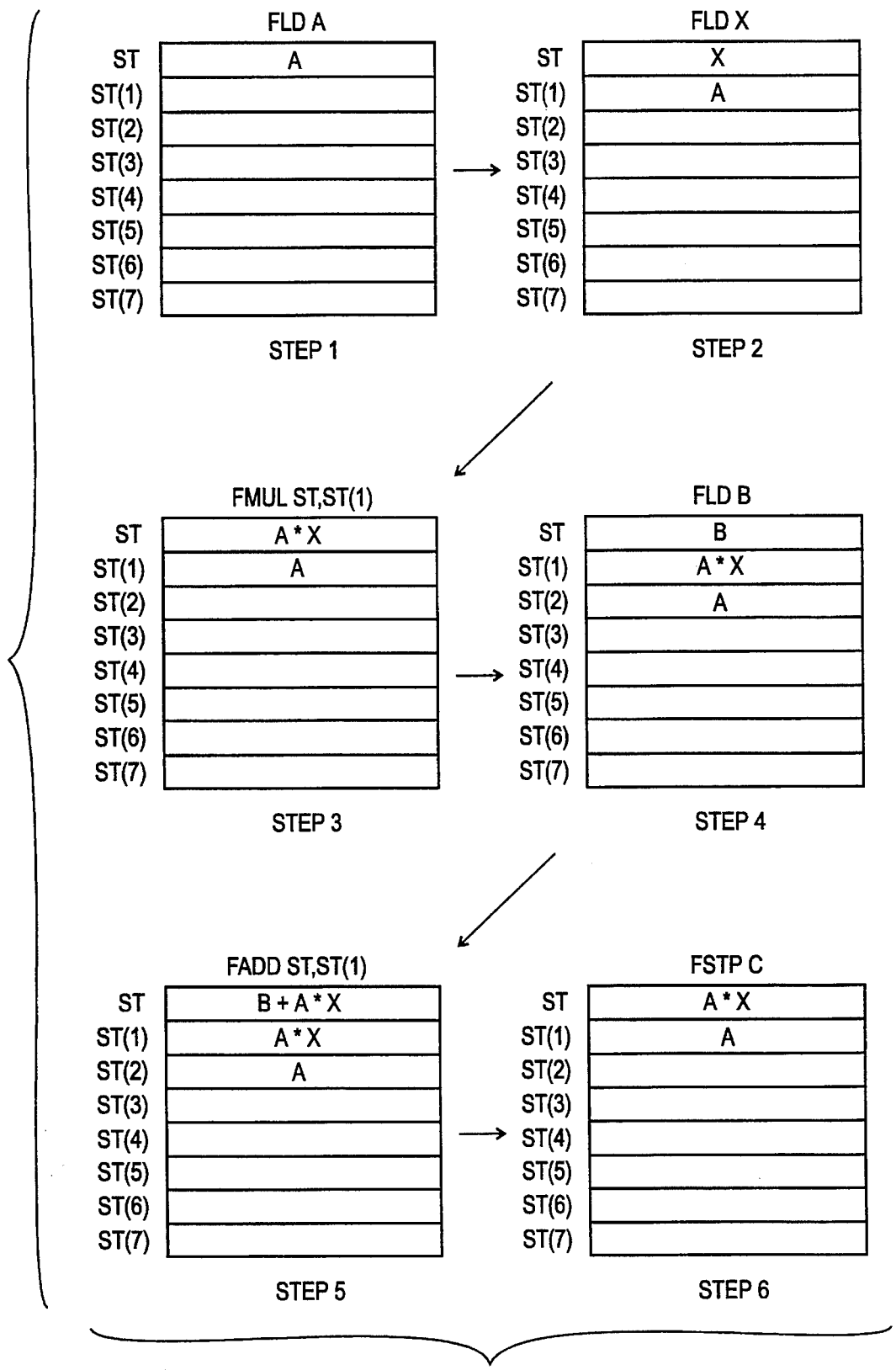
FIG. 3C is a block diagram illustrating operation of a stack-based coprocessor for evaluating numeric expressions.

Referring now to FIG. 3C, operation of stack-based coprocessors, such as the Intel coprocessors, will be illustrated. Consider a simple calculation, C=AX+B, where A, B, C and X reference floating-point values stored in system memory. For stack-oriented evaluation, operand tokens of an expression are first loaded, then an operator is applied. This format, commonly dubbed "Reverse-Polish Notation" (RPN) or "postfix" format, is well known (and perhaps best known from its use in a popular line of pocket calculators).

Evaluation of the above expression may be accomplished with the following machine language instructions (for 80×87 coprocessors):

| | | | |
|---|---|---|---|
| FLD | a | ; | (1) push a onto stack |
| FLD | x | ; | (2) push x onto stack |
| FMUL | ST, ST (1) | ; | (3) multiply a by x, result stored in ST |
| FLD | b | ; | (4) push b onto stack |
| FADD | ST, ST (1) | ; | (5) add b to (a * x) |
| FSTP | c | ; | (6) store result in c, pop from stack |

The first instruction, FLD a, tells the coprocessor to push the value stored in the memory location a onto the top of the stack (i.e., into the first register, ST). The second instruction, FLD x, pushes the value of x onto the stack, thereby pushing the value of a down the stack (i.e., into the second register).

With two operands stored on the stack, the operator may now be applied. For the desired operation at this point (i.e., multiplication), the instruction FMUL ST,ST(1) is employed to instruct the coprocessor to multiply the values stored in the top two registers, ST and ST(1); the result of the operation is stored on the top of the stack (i.e., in ST). The stack now contains the values a*x (in ST) and a (in ST(1)).

The value of b is now pushed onto the stack by the instruction FLD b. The value of b may now be added to the product of a*x by issuing the FADD instruction, which adds the value stored in the ST register to that stored in the ST(1) register. The result of the operation is again stored back into ST. The stack now stores in its registers values for ax+b, ax, and a. The value of ax+b, which is at the top of the stack, is the desired result of the calculation. It may be popped off the stack and stored into a memory location (denoted by c) by issuing the FSTP instruction.

C. Handling Coprocessor Exceptions

Since the floating-point formats support a limited range of numbers the possibility exists that a result of a calculation may be outside of the range. Consequently, floating-point hardware must be able to detect these conditions. The IEEE standard specifies that an out-of-range value or "overflow" be replaced by one of two special values, +∞ or −∞. These infinite values are represented by setting the exponent bits high (all 1 bits) and the mantissa bits low (all 0 bits). In this fashion, when infinite values are encountered in subsequent operations, they may be handled in a predictable fashion, such as +∞+1.0=+∞, or 1/(+∞)=0.

In addition to the possibility of overflow, there exists the possibility of calculations where no meaningful result can be determined. Examples include dividing 0 by 0, or subtracting +∞ from itself. As in the case of overflows, the IEEE standard defines a special value (in addition to specifying that the error may be trapped, interrupting the calculation). The special value which indicates that no meaningful result is possible is called a "NAN" (Not a Number). NaNs are represented by a bit pattern having a maximum exponent (all exponent bits set to 1) and a non-zero mantissa (at least one mantissa bit set to 1).

The IEEE standard specifies two types of NaNs: signalling and non-signalling NaNs. Signalling NaNs are typically trapped as errors. If either of the operands of an arithmetic operation is a non-signalling or "quiet" NaN, on the other hand, the result is simply another NaN; no error is trapped. In this manner, NaNs may be silently propagated to mark subsequent results as possibly unreliable; this propagation does not interrupt the sequence of operations, however. Moreover, the mantissa bits in the NaN format may be employed to encode an error identification, for indicating the reason for the generation of the NaN.

To track these and other error conditions or "exceptions," including stack overflow and underflow, the Intel coprocessor maintain a 16-bit "Status Word" register. The Status Word register, which is divided into fourteen fields, reports the current state of the coprocessor. The following table illustrates the layout of the status bits.

TABLE 1

| Bits | Purpose | |
|---|---|---|
| 0 | Exception Flag: | Invalid Operation |
| 1 | Exception Flag: | Denormal Operation |
| 2 | Exception Flag: | Zero Divide |
| 3 | Exception Flag: | Overflow |
| 4 | Exception Flag: | Underflow |
| 5 | Exception Flag: | Loss of Precision |
| 6 | Stack Flag (undefined on 8087 & 287) | |
| 7 | Error Summary (Interrupt Request on 8087) | |
| 8 | Condition Code 0 | |
| 9 | Condition Code 1 | |
| 10 | Condition Code 2 | |
| 11–13 | Stack Top Pointer | |
| 14 | Condition Code 3 | |
| 15 | Busy Flag | |

When an error occurs in a calculation, the coprocessor sets one or more of the exception flag bits in the Status Word Register.

A Control Word register is also provided for specifying operational options, under programming control. It includes the following bit layout.

TABLE 2

| Bits | Purpose | |
|---|---|---|
| 0 | Exception Mask: | Invalid Operation |
| 1 | Exception Mask: | Denormal Operation |
| 2 | Exception Mask: | Zero Divide |
| 3 | Exception Mask: | Overflow |
| 4 | Exception Mask: | Underflow |
| 5 | Exception Mask: | Loss of Precision |
| 6 | Reserved | |
| 7 | Interrupt Enable (8087 only) | |
| 8–9 | Precision Control | |
| 10–11 | Rounding Control | |
| 12 | Infinity Control | |
| 13–15 | Reserved | |

By setting or clearing these bit fields, the programmer can exercise control over the operation of certain aspects of the coprocessor, including masking certain exceptions and errors.

The architecture and operation of Intel coprocessors are documented in the technical, trade, and patent literature. Data sheets and reference manuals are available from Intel Corp. of Santa Clara, Calif. For additional description of the operation of the '387 coprocessor, see: 387*DX Math Coprocessor Data Sheet* (Part No. 240448) and 387*DX User's Manual, Programmer's Reference* (Part No. 231917). For operation of the '486's FPU, see: *i*486 *Microprocessor Data Sheet* (Part No. 240440); *i*486 *Microprocessor Programmer's Reference Manual* (Part No. 240486); and *i*486 *Microprocessor Hardware Reference Manual* (Part No. 240552). The disclosures of each of the foregoing are hereby incorporated by reference.

FORMULA EVALUATION IN AN ELECTRONIC SPREADSHEET

With the reader having a basic understanding of the operation of a floating-point unit, methods of the present invention for evaluating and compiling formulas in an electronic spreadsheet may now be described.

A. Cell Records and Cell Addresses

A spreadsheet comprises an array of cells— storage locations which may be represented in memory and on disk. Every cell used in a spreadsheet has a cell record associated with it. A cell record typically represents a cell value and attributes, for a particular cell location. An integer stored in a cell, for instance 5 stored in cell A1, may be represented by an integer cell record:

```
Integer Cell Record
    rec_type = RT_IntegerCell = 13
    rec_len = 8
    rec_body
        BYTE        column;
        BYTE        page;
        WORD        row;
        unsigned    unused : 3;
        unsigned    attr_id : 13;    // attribute id
        int         integer;         // value
```

A floating-point cell may be represented by:

```
Floating-pt Cell Record
    rec_type = RT_FloatCell = 14
    rec_len = 14
    rec_body
        BYTE        column;
        BYTE        page;
        WORD        row;
        unsigned    unused : 3;
        unsigned    attr_id : 13;    // attribute id
        double      x;               // value
```

A "blank" (empty value) cell may be represented by:

```
Blank Cell Record
    rec_type = RT_BlankCell = 12
    rec_len = 6
    rec_body
        BYTE        column;
        BYTE        page;
        WORD        row;
        unsigned    unused : 3;
        unsigned    attr_id : 13;    // attribute id
```

Text labels, on the other hand, may be represented by:

```
Label Cell Record
    rec_type = RT_LabelCell = 15
    rec_len = 7 + size of label + 1
    rec_body
        BYTE        column;
        BYTE        page;
        WORD        row;
        unsigned    unused : 3;
        unsigned    attr_id : 13;    // attribute id
        char        prefix;          // label prefix
        char        label[ ];
```

Thus, as shown, location for the cell is stored by the column and row coordinates (the page may be deduced from the Page ID). Actual attributes for the cell may be specified in a cell attribute lookup table, the cell record proper storing a terse attribute identifier (attr_id) referencing the appropriate table entry which describes this cell (and possibly others).

Formulas, which are stored in system memory at runtime as Formula Cell Information records, are represented internally as opcodes or "p-code," in familiar Reverse-Polish Notation (RPN) form. The opcodes may be converted back into text strings ("de-parsed") for easy on-screen editing of formulas by the user. In an exemplary embodiment, a Formula Cell Information Object is created in system memory, the object being instantiated from the following C++ class:

```
class _CEXPORT_ FmlCellInfo : public SSCellInfo
{
    double        value;       // formula's values
    SSCellRef     loc;         // formula's location
    FmlCellInfo   *next;       // the next formula cell in the
                                  chain
    FmlCellInfo   *prev;       // the prev formula cell in the
                                  chain
    void (*feval) ( );         // ptr to compiler formula (pCF)
    WORD          state;       // formula's state
    WORD          wLen;        // length of formula
    WORD          wRefPos;     // starting position of references
    char          formula[ ];  // formula bytecodes of variable
                                  length
};
```

As shown, an instantiated Formula Cell Information Object includes a value member and a formula[] array. The bytecode formula is stored in formula[]. The calculated result for the cell, on the other hand, is stored as value. The object also stores a pointer-to-compiled formula, (*feval)(), for the cell. If no compiled formula is available, the pointer is set to NULL.

The cell address associated with each cell record corresponds with or is translatable into an on-screen location for the cell of the record. As shown by the cell records above, cell page, row, and column location are represented by single or multi-byte identifiers. In an exemplary embodiment, each cell reference resolves to a 6-byte identifier logically composed of:

10 bits notebook ID 6 bits reserved 8 bits sheet ID 8 bits column #

3 bits reserved 13 bits row #

For instance, Column B is represented by the number 1, and row 3 is stored as 2 (there is no row 0). So a typical cell reference, like C7 (on the first page with only one notebook active), would be represented by a six-byte identifier of notebook 0|sheet 0|column 2|row 6. Particular bits in the 6-byte identifier may be employed for indicating absolute and relative addressing, as is known in the art. The relative and absolute bits (which are not of interest here) are simply treated as reserved.

Literature describing cell record and/or opcode formats for Lotus 1-2-3®, Microsoft Excel®, and Borland Quattro® Pro are available from the respective vendors. Additional description for Quattro® Pro may be found in U.S. patent application Ser. No. 08/029,807, now pending, commonly owned by the present assignee.

B. Stack-based Recalculation of Formulas

In operation, a spreadsheet formula evaluator, such as Evaluator 136, may employ a stack-based mechanism for evaluating formulas, similar in operation to that previously described for the coprocessor. The actual order employed for recalculating a multitude of formulas may be any one of the well-known methodologies (previously described), including natural, columnwise, rowwise, or the like.

Given the expression A1+2*A2, an evaluator starts by reading the cell reference of A1 (more specifically, the six-byte cell identifier for A1), determining the memory location for the cell, fetching the value stored at that memory location, and pushing it onto a stack (e.g., coprocessor stack). The next token, 2, is read and its value is pushed onto the stack; the coprocessor is then instructed to evaluate the operands on the stack (an addition operation for this example). The process may continue to operate in this manner until all operands have been evaluated, thereby leading to an end result (on the top of the stack).

Evaluation of spreadsheet formulas using a stack-based token interpreter has been described in the technical, trade, and patent literature. A typical implementation is described in FORMULA PROCESSOR, International Application No. 92307280.5, International Publication No. 0 527 622 A2, Feb. 17, 1993, which is hereby incorporated by reference. Since opcode tokens are interpreted at runtime with each recalculation operation, however, systems employing such an approach lack performance benefits attendant with compiled formulas.

C. Spreadsheet Formula Compilation

1. General

According to the present invention, operation of both the floating-point unit 115 and the Formula Evaluator 136 are modified so that spreadsheet formulas may be compiled into native machine code for a target processor and coprocessor (e.g., Intel 80×87/80×86). Although spreadsheet formulas may be compiled entirely to non-floating point machine code for execution by an integer processing unit, the best performance gains are realized when the formulas are compiled to floating point machine code for execution by a system having a math coprocessor.

At the outset, it should be appreciated that cell formulas cannot simply be "compiled" directly into native machine code for a target processor. Consider, for instance, the evaluation of a simple formula: A1+B3. In simplistic terms, one may think of this as evaluation of the following expression (in RPN form): A1 B3+. In operation, however, this does not simply involve fetching a value from A1, fetching a value from B3, and then adding the two together, such as:

```
    FLD    A1          ; ??? - - not meaningful
    FLD    B3          ; ??? - - not meaningful
    FMUL   ST,ST(1)    ; wrong!
```

Since a target coprocessor requires that values be loaded from system memory, compiled machine language for the coprocessor requires valid system memory addresses (not cell identifiers, such as A1 and B3). Thus, before spreadsheet formulas may be compiled, an efficient mechanism for resolving cell identifiers as system memory addresses is required.

Besides resolving addresses used in formulas at compile time, other problems must be addressed. For instance, A1 may store a number or a text string; or the cell may be empty (blank), in which case storage for the cell has not even been allocated. Moreover, the cell may store a special value, such as ERR or NA, which requires special propagation to dependent cells. In addition to managing data types of operands, a system must monitor for stack overflow and underflow. All told, a spreadsheet formula, such as A1+B3, cannot simply be "compiled" directly into machine code. Instead, a system must first overcome a number of problems.

2. Cell Addresses in Compiled Formulas

To make compilation of formulas feasible, improved methodology for looking up values in cells (i.e., resolving cell addresses) is required. As previously described, a math coprocessor loads operands from and stores results to system memory; thus machine language for the coprocessor must include valid system memory addresses (not cell identifiers). Moreover, as memory for cells is allocated in blocks or chunks (since it is generally not desirable to allocate system memory for all cells present in a spreadsheet), it is not feasible to predict beforehand where a given cell will be stored in memory (i.e., what allocated memory block, if any, contains the cell).

The present invention recognizes that at runtime allocated memory blocks for cell information are typically fixed (i.e., not likely to move to new locations). This aspect may be exploited to improve cell lookups, making compiled formulas practical. In a preferred embodiment, formulas are compiled to machine code upon the first recalculation operation, typically when a spreadsheet is first loaded (i.e., when cell records for the spreadsheet are loaded from disk into system memory). Since the formulas are compiled after the cell records have been loaded into system memory, the various cell addresses in formulas may be resolved to actual addresses in system memory. For the cell A1, from the formula in the example above, the system may determine a particular memory address where storage for the cell has been allocated. This address for the cell may then be compiled directly into the machine language sequence for the spreadsheet formula.

Since in-memory addresses for cells are not fixed from session to session, machine code for compiled formulas is not saved to disk in a preferred embodiment. Specifically, as the memory addresses for cell references are coded directly into compiled formulas and those addresses can only be determined upon loading the spreadsheet into memory, it is not useful to store compiled formulas from one session to another, as the memory addresses in those compiled formulas will likely change. The machine code is instead generated on-the-fly, at the first recalculation opportunity, with all subsequent recalculation operations employing the in-memory compiled formulas to greatly increase recalculation speed.

Although memory addresses for cells are generally fixed once a spreadsheet has been loaded into memory, certain user operations may in fact change the memory addresses. Memory addresses may be affected, for instance, when the user deletes a spreadsheet row or column. In such an instance, memory allocation for the cells of the spreadsheet typically changes, resulting in new (logical) memory addresses for the respective cells.

To correctly handle these situations, the system of the present invention maintains a validity flag for indicating whether an operation has occurred which would invalidate the compiled cell addresses (e.g., movement of a memory block). Operations which affect memory allocation include a call to invalidate the flag when an operation affecting cell addresses occurs. On the next recalculation operation, new compiled formulas are generated, using newly determined cell addresses. At that point, the flag may be once again validated, for indicating availability of compiled formulas for use with subsequent recalculation operations. As a practical matter, operations which affect memory allocation (e.g., adding and deleting rows) typically occur during the design phase of a particular spreadsheet model. Once that spreadsheet has been deployed to an end-user for use, e.g., as a tax template, user operations which would affect memory allocation are typically infrequent.

3. ERR and NA Propagation

When evaluating formulas, a conventional floating-point formula interpreter must perform a number of error checks. Specifically, such an interpreter must correctly handle instances of spreadsheet error (ERR), such as divide-by-zero, or instances of a value being not available (NA), such as when a dependent spreadsheet is not loaded. Incorporating numerous checks in compiled formulas, however, would significantly degrade performance, perhaps making formula compilation impractical. Accordingly, improved checking methodology is required for compiled formulas.

According to the present invention, operation of the coprocessor is adapted to accommodate ERR and NA values, ensuring their proper handling and propagation. Industry-standard rules exist for propagating ERR and NA in electronic spreadsheets. ERR combined with a number is defined to evaluate to ERR (e.g., ERR+5=ERR). Similarly, NA combined with a number is defined to evaluate to NA (e.g., NA+5=NA). Finally, ERR combined with a NA must result in ERR (e.g., ERR+NA=ERR).

As previously described, the Intel floating-point processors include formats for positive and negative infinity and NaN ("Not a Number"). Consider storage of a real number, such as 1.2 e 20 ($1.2 \times 10^{20}$). When the number is stored (in IEEE double format), it is converted into a specific binary format which includes 1 bit for the sign, 11 bits for the exponent, and 52 bits for the mantissa. Recall further that the largest possible exponent is reserved for indicating infinity and NaNs. The bit sign still serves to indicate $+\infty$ or $-\infty$ (for positive or negative infinity). The mantissa bits indicate infinity when all are set to zero, or indicate NaN when at least one non-zero bit is present.

The system of the present invention employs these formats for representing spreadsheet ERR and NA values. Specifically, spreadsheet ERR and NA values are stored as (IEEE format) NaN values; ERR and NA may be distinguishable from one another via the mantissa bits (e.g., one particular mantissa bit pattern for ERR, another for NA). In a spreadsheet, for instance, adding a cell with a value of 2.1 to a cell with an ERR should yield a result or ERR. By encoding the ERR as a NaN, the coprocessor adds 2.1 to a NaN, thereby yielding a NaN (i.e., ERR). Since adding a NaN (e.g., representing an ERR or a NA) to a non-NaN yields a NaN with an unchanged mantissa bit pattern (i.e., preserving it as an ERR or NA), the floating-point processor's rules for propagating NaNs may be employed for correctly propagating ERR and NA values.

Although an operation which combines a NaN with a non-NaN will propagate the NaN correctly (i.e., will propagate the NaN mantissa bit pattern without regard to the non-ERR operand), an operation may on occasion require the combination of two NaNs (e.g., adding a cell with NA to a cell with ERR). Standard spreadsheet rules for propagating ERR and NA require that ERR combined with NA yields ERR. The coprocessor rules for combining two NaNs may be employed to effect this result. In operation, the coprocessor, when required to combine two NaNs, sets the mantissa bits of the resultant to that of the NaN with the larger mantissa. By defining ERR to have a larger mantissa bit pattern than NA, the on-chip logic of the coprocessor may be employed to correctly propagate spreadsheet ERR over NA. In this fashion, the NaN propagating rules of the processor chip automatically ensure that ERR and NA values are correctly propagated, thus eliminating the need for the spreadsheet system to maintain special logic (e.g., in a compiled formula) for correctly propagating spreadsheet ERR and NA values.

4. ERR and NA Examples

Figure 4B:
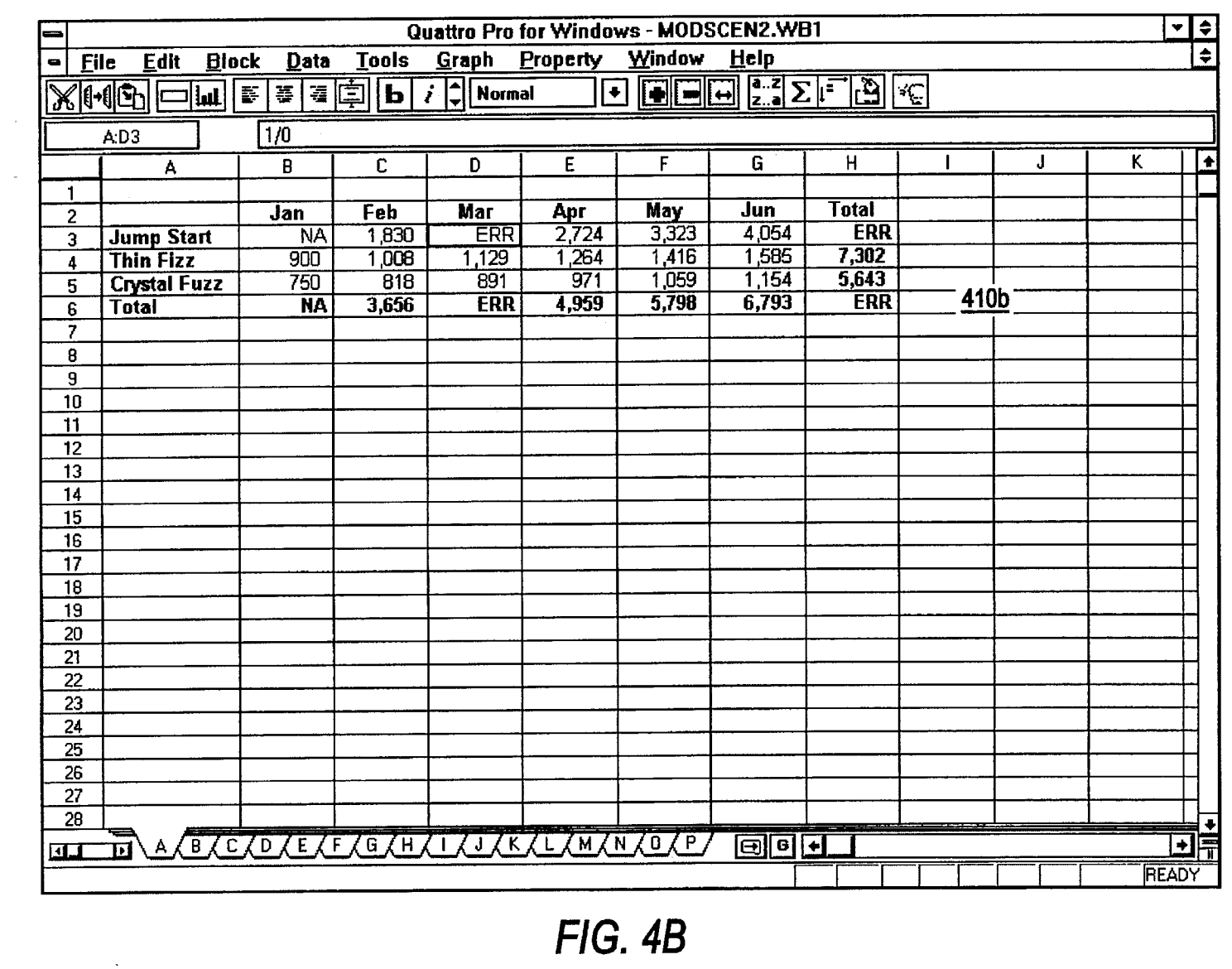

Referring now to FIGS. 4A–E, processing of NA and ERR for the spreadsheet of FIG. 2A will be illustrated. FIG. 4A shows spreadsheet 410*a* having the value NA entered into cell B3 (by the user entering @NA—a spreadsheet function whose sole purpose is to return the value NA). As shown, the value NA in cell B3 propagates to cell B6, which stores the formula @SUM(B3 . . . B5). Similarly, the NA value of cell B3 propagates to cell H3, which stores a formula of @SUM(B3 . . . G3). The NA value in cell H3 further propagates to cell H6; the cell H6 stores a formula of @SUM(H3 . . . H5).

In FIG. 4B, further modification is made to the spreadsheet (now, spreadsheet 410*b*) to include an ERR value. Specifically, the user has entered 1/0 (i.e., 1 divided by 0) in cell D3. As a result, cell D3 displays the value ERR. Cell D6 which stores a direct reference to cell D3 (i.e., @SUM(D3 . . . D5)) also displays ERR. Similarly, the ERR value expressed in cell D3 also propagates to cell D3, which stores a formula referencing the cell D3 (as previously described). Note that the cell H3 includes references to both a cell storing NA (i.e., cell B3) and a cell storing ERR (i.e., D3). According to spreadsheet propagation rules (as described above), ERR propagates over NA. Finally, the ERR value of cell D3 propagates indirectly to cell H6, since H6 stores a reference to cell H3 (which in turn references cell D3, as previously described).

FIG. 4C shows in detail the bit pattern layout for encoding NA and ERR as a "quiet" (non-signalling) NaN in both 80-bit IEEE temporary real (TReal) and 64-bit IEEE double formats. As previously described, the exponent bits of a NaN are set high (i.e., equal to 1). Also required for the NaN (to distinguish it from infinity) is a non-zero mantissa. Thus, the most significant bit of the TReal mantissa (bit 63) is set high (for the double, it is implied to be 1).

For indicating whether a NaN value is ERR or NA, the system of the present invention encodes information in bits 60–62 of the TReal. After mapping the TReal into a 64-bit double, ERR and NA are represented as follows:

(1) NA without encoded address:

| | | | |
|---|---|---|---|
| 0111 | 1111 | 1111 | 1010 + "Don't care" |
| 7 | F | F | A |

(2) NA with encoded address:

| | | | |
|---|---|---|---|
| 0111 | 1111 | 1111 | 1011 + Encoded address |
| 7 | F | F | B |

-continued (3) ERR without encoded address:

| 0111 | 1111 | 1111 | 1100 + "Don't care" |
|------|------|------|---------------------|
| 7    | F    | F    | C                   |

(4) ERR with encoded address:

| 0111 | 1111 | 1111 | 1101 + Encoded address |
|------|------|------|------------------------|
| 7    | F    | F    | D                      |

Thus the fourth nibble (4 bits) of the 64-bit double includes a "trigger bit" for distinguishing NA (A or B) from ERR (C or D). Also, the nibble of ERR may be set to an E or F to indicate a more severe form of ERR (e.g., divide by zero). NA and ERR NaNs without addresses above (e.g., fourth nibble equal to A or C) are provided for compatibility with legacy systems (e.g., 1-2-3).

The address of the cell where the ERR or NA originated is encoded in particular bits of the mantissa. As shown, 48 bits are used in a preferred embodiment for encoding cell addresses; this is the 6-byte cell identifier previously described.

Propagation of the NA value in spreadsheet 410a and propagation of the ERR value of spreadsheet 410b within a coprocessor are illustrated in FIGS. 4D–E. FIG. 4D illustrates the operations which occur in the coprocessor during evaluation of the formula for cell B6, @SUM(B3 . . . B5). First, the value for cell B3 is pushed onto the coprocessor stack (i.e., loaded into the ST register). Specifically, the ST register of the coprocessor is loaded with a quiet NaN having a mantissa encoding NA and the address of B3. As shown, bits 451 are set to indicate NA (i.e., lower than ERR). Bits 453, on the other hand, encode the address of cell B3. Next, the value stored in cell B4, 900, is pushed onto the register stack at step 2. At step 3, the two values are added together, thus leaving the NaN which encodes NA and cell B3 on the top of the stack (i.e., as the immediate result). Next the value stored in cell B5, 750, is pushed onto the stack at step 4. At step 5, the two values are added together which again results in the NaN encoding NA and cell B3 on the top of the stack. Thus the result of the formula for cell B6 is a NaN encoding NA and the cell address of B3.

FIG. 4E illustrates the specific operation of the coprocessor for evaluating the formula of cell D6 in spreadsheet 410b (of FIG. 4B). As the first step, a value for ERR is pushed onto the coprocessor stack. This is done by pushing a quiet NaN encoding ERR and the cell address D3. Specifically, mantissa bits 461 are set high, for distinguishing this NaN from a NaN encoding NA. The address bits 463 encode the address of cell D3—the cell where the ERR value originates. At step 2, the value stored in cell D4, 1129, is pushed onto the register stack. At step 3, the two values are added together, thus leading to the NaN encoding ERR and cell D3 at the top of the stack (as the immediate result). At step 4, the value stored in cell D5, 891, is loaded, and at step 5 the two values are added together. As before, a NaN combined with a non-NaN yields the NaN, thus leaving the NaN encoding ERR and cell D3 at the top of the stack. Hence, evaluation of the formula for cell D6 of the spreadsheet 410b yields a NaN having ERR and the cell address of D3.

Figure 5B:
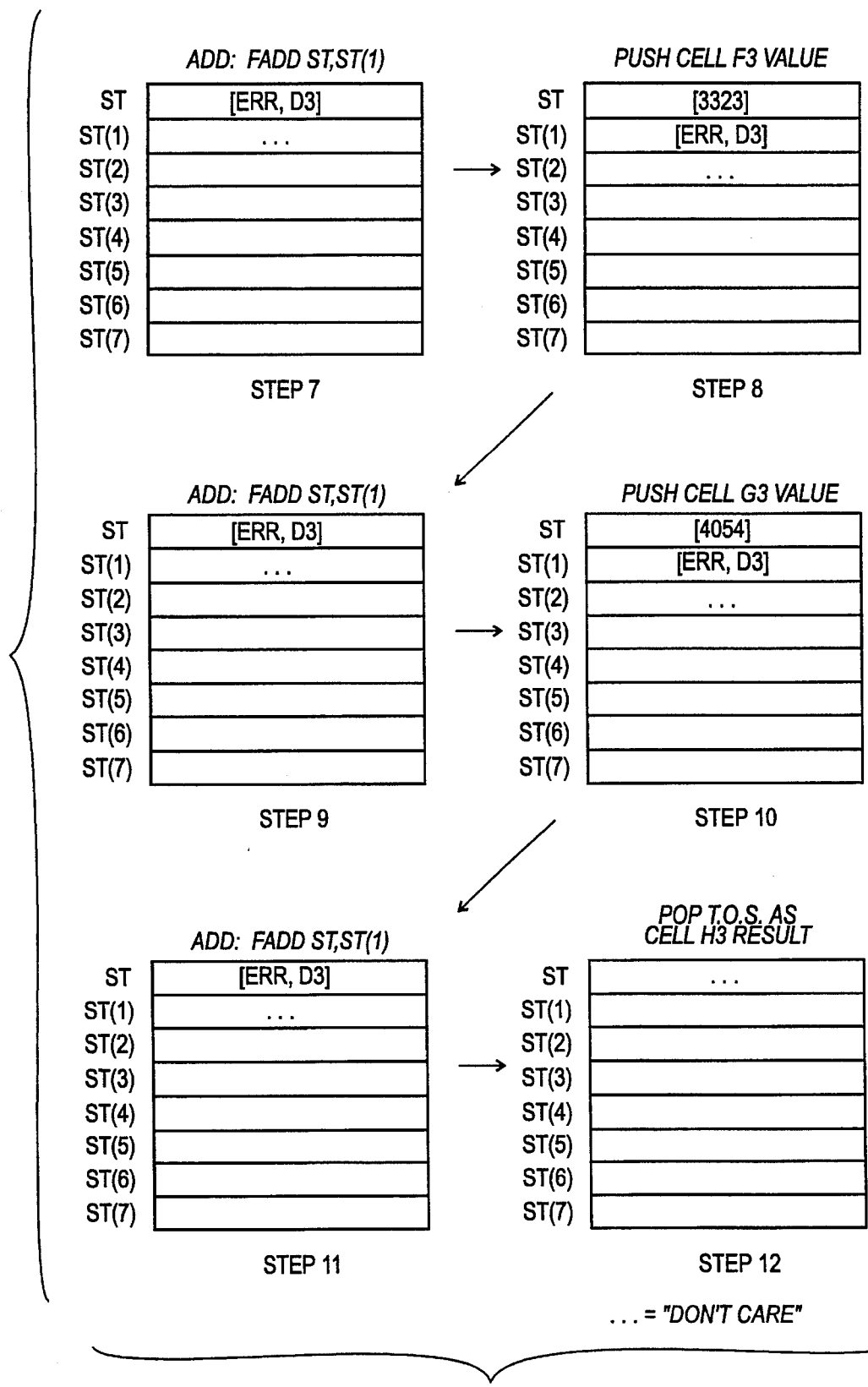

The interplay between NaNs encoding NA and those encoding ERR is illustrated in FIGS. 5A–B. Recall that the cell H3 of the spreadsheet 410b stores a formula which references cells having both NA and ERR values. For simplification, FIG. 5A–B will represent values stored in coprocessor registers in shorthand format, such as "[NA, B3]" representing a NaN encoding NA and the address for cell B3.

As the first step, the value for cell B3 is pushed onto the stack. As shown, this results in a NaN encoding NA and the address of cell B3 being stored in the ST register. Next, the value stored in cell C3 is pushed onto the stack, as shown at step 2. At step 3, the two values are added together, thus leaving the [NA, B3] NaN at the top of the stack (as the immediate result). At step 4, the value for cell D3 is pushed onto the stack, thus resulting in a NaN encoding ERR and the address of D3 being stored in the ST register. At step 5, the two top values (i.e., in ST and ST(1)) are added together; this operation results in the [ERR, D3] NaN at the top of the stack (as the immediate result). It is important to note at this step that the [NA, B3] NaN combined with the [ERR, D3] NaN yields a result of [ERR, D3] NaN. In other words, the ERR value of cell D3 propagated over the NA value of cell B3.

Continuing with the example, at step 6 the value for cell E3, 2724, is pushed onto the stack. At step 7 the two top values are added, thus leaving the [ERR, D3] NaN at the top of the stack (as the immediate result). At step 8, the value for cell F3, 3323, is pushed onto the stack. At step 9, the two values are added, thus leaving the [ERR, D3] NaN at the top of the stack. At step 10, the value for cell G3, 4054, is pushed onto the stack. At step 11, the two top values are added, thus leaving the [ERR, D3] NaN at the top of the stack—the final result for the formula of cell H3. As shown at step 12, the value may be copied/moved (stored/popped) into an appropriate system memory location.

5. Use of Embedded Address for Auditing

A spreadsheet of even modest complexity contains many formulas, resulting in numerous intercell dependencies. An error occurring in any one cell may be difficult for the user to track down and eliminate. Specifically, since the cell may in turn depend from a multitude of cells, and those cells may in turn reference a multitude of other cells, the user would in a conventional system have to check the formula of each cell from which the cell directly or indirectly depends. All told, eliminating errors in a spreadsheet of even modest complexity may be a daunting task for the user.

Figure 6A:
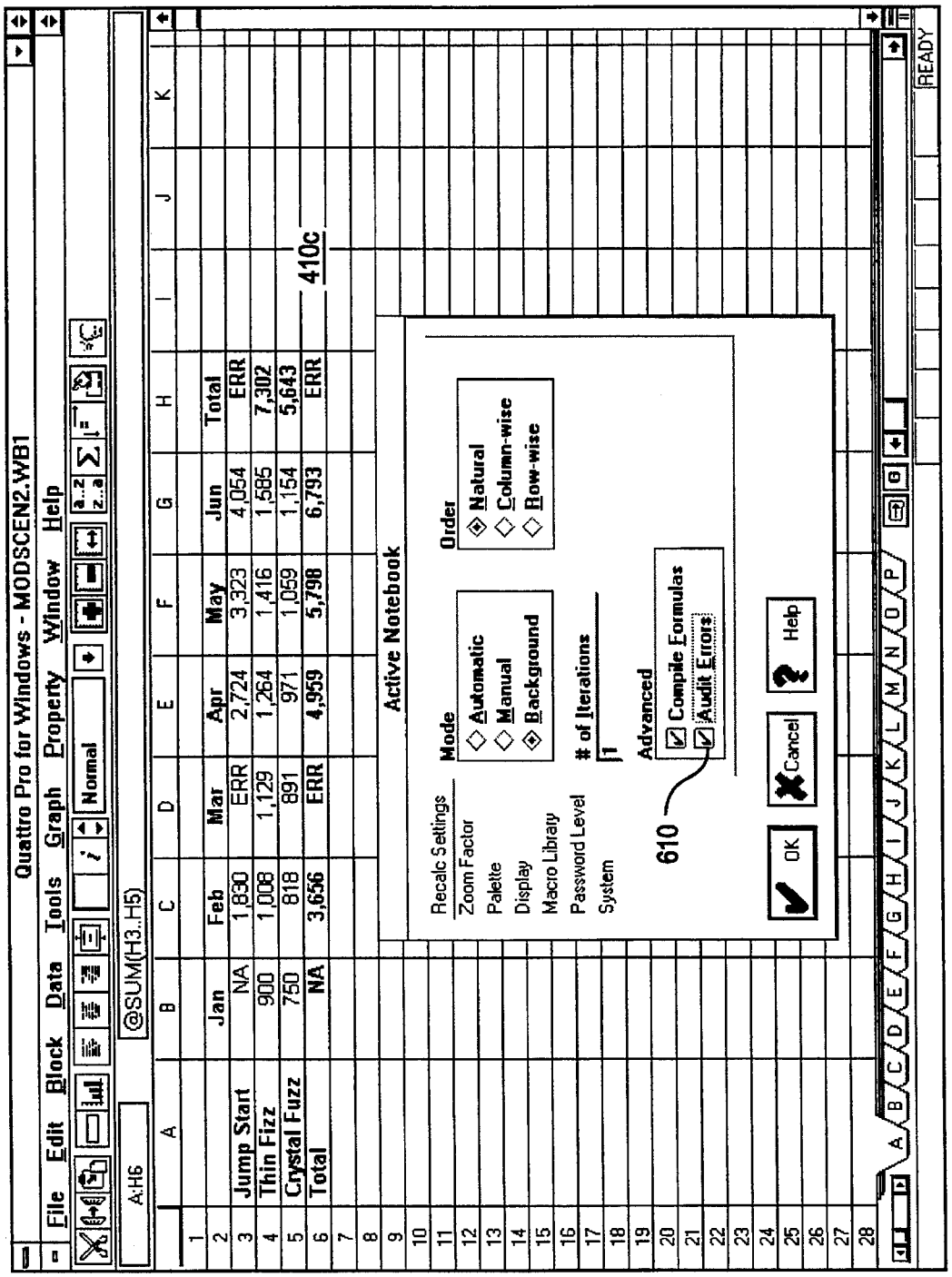

FIGS. 6A–B illustrate use of the cell address encoded in NA and ERR NaNs for quickly auditing the source of errors in a spreadsheet. FIG. 6A illustrates selection of an Audit Errors tool 610 for the spreadsheet 410 (now, spreadsheet 410c); the tool may be presented to the user using standard graphic user interface methodology, as shown. Upon selection of the tool by the user, the spreadsheet 410 is updated as shown in FIG. 6B (now, spreadsheet 410d). The spreadsheet now displays the embedded cell address in those cells to which it propagates. Thus for the error value displayed in cell H6, the user may readily discern upon glancing at the cell that the error value is a result of an error occurring in cell D3. Note, however, that the cell H6 does not depend directly from the cell D3. Instead, the cell H6 depends directly from cell H3 which, in turn, depends directly from cell D3. Thus, the propagation of the address of the originating cell to all destination cells, regardless of how many intervening cells and their formulas there are between the cell being audited and the cell which is the source of the error, allows the system to immediately display the source of error to the user. The user may immediately proceed to the source of the error, without expending any effort tracing through a multitude of intervening formulas.

6. Compiling Formulas

Compiling formulas from their RPN token interpreter format to executable machine code occurs in several steps.

In particular, several conditions should be met during compilation for the compiler of the Evaluator to generate a compiled formula. In the currently preferred embodiment, the compiler may attempt to compile all formulas, but generally it will not compile formulas with complicated @-functions or transcendental functions.

In an exemplary embodiment, the formula compiling method is performed by scanning the tokens of the formula in two passes. In a first pass, the tokens are checked for "compilability" (i.e., ability to be compiled into 80×86/80× 87 instructions). Also at this pass, a reference list is built.

```
Formula Compiling:
// first pass:
// scan token, checking token compilability and building reference
    list while not end of formula
        check token type for compilability
        if token is an operand
            if operand is constant, store value in reference list,
    otherwise
            locate cell reference and attempt to generate pointer to cell
            pointer
                if cell pointer/body is not allocated then fail
                otherwise store pointer in reference table
    end while
```

As shown, the reference list is built by storing a value in the list for each constant and storing a pointer in the list for each cell reference. If a cell being referenced is not available (i.e., pointer to cell cannot be generated), then the attempt to compile the formula is abandoned (i.e., the first pass fails).

In the second pass, the compiler generates the actual compiled formula for the formula by scanning the tokens and emitting a machine language sequence (for the target processor/co-processor).

```
// second pass: generate code for each token type
    while not end of formula
        switch on token type to code generation subroutine for the
        class of token found
            for push constant value generate push offset to value of the
            correct data type
            for push argument tokens generate offset and call linkage to
            push value func.
            for simple operators, generate appropriate floating point
            instruction
            for complex operators, generate several floating point
            instructions
            for simple @functions, generate code sequence for the CPU
            and FPU that
                implement the function. Also use calls to push value
                functions.
    end while
```

As shown, the method proceeds based on the type of token. For a constant value (e.g., 5 in A1+5), an offset to the value (i.e., an offset into the reference list) is generated. For an argument token (i.e., argument to a function), an offset is generated as well as a call linkage to the corresponding function. When a simple operator is encountered (e.g., "+"), an appropriate floating point instruction is generated (e.g., FADD for "+"). For a more complex operator, a series of instructions implementing the operator are generated. For @-functions, a code sequence that implements the function is generated for the target processor/coprocessor. At the completion of the two-pass method, a compiled formula has been generated; this is stored in system memory at a location pointed to by the cell's pointer-to-compiled formula (pCF).

7. Compiled Formula Storage and Execution

Figure 7:
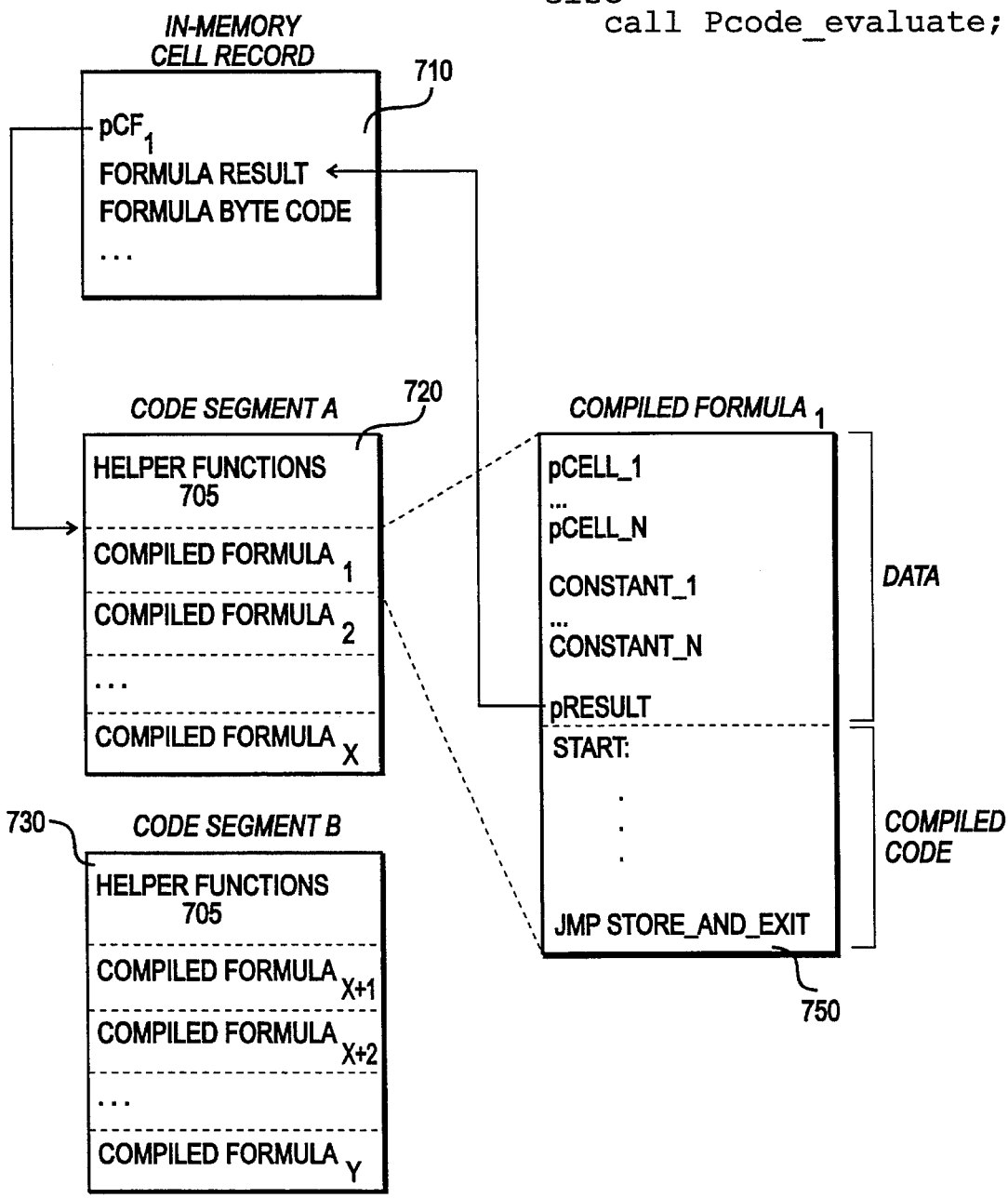
FIG. 7 is a block diagram illustrating the in-memory relation between cell records and compiled code formulas (which are stored in one or more code segments).

In addition to compiling a formula into a native machine language sequence, the present invention provides methods for compiled formula storage and execution. As shown in FIG. 7, the compiled formulas are stored in one or more code segments (e.g., segments 720, 730). The specific in-memory relation between cell records and compiled code formulas, as well as the internal organization of a compiled formula, will now be described.

FIG. 7 shows the in-memory layout of a cell record 710. The cell record includes, among other things, a pointer-to-compiled formula (pCF), a formula result (64-bit IEEE double), and a formula array (storing the formula p-code). The pointer to the compiled formula for the cell record points to an offset in a code segment which stores the corresponding compiled formula. Compiled formulas for a spreadsheet are stored in one or more code segments (e.g., Code Segment 720, 730). The upper-size limit of any one particular code segment depends on system implementation; in an Intel 80×86 segmented architecture, for instance, segments are limited to no larger than 64K. For the cell record 710, $pCF_1$ points to Compiled Formula$_1$, which resides in Code Segment 720. In the event that the pointer to the compiled formula is set to NULL, the Formula Evaluator will fallback to standard interpreter-based formula evaluation (i.e., evaluating the p-code sequence stored in the cell record's formula array with a runtime interpreter). The pointer is set to NULL when a formula cannot be compiled.

As shown, each code segment includes a copy of Helper Functions 705. The Helper Functions 705 are useful routines for assisting with the execution of compiled formulas. In an exemplary embodiment, one using Intel segmented architecture, the Helper Functions are stored in the same segment—that is, as a "near" library. In this manner, a compiled formula may invoke Helper Functions in its code segment as a "near" call (thus resulting in faster execution).

The layout for the Compiled Formula$_1$ is shown in detail by memory block 750. In particular, the Compiled Formula Memory Block 750 comprises a first section for storing data and a second section for storing compiled (machine language) code. The data section typically stores the reference list as a table comprising pointers to cells which have been referenced within the formula. After the cell lookups, the data section stores any constant values (e.g., the value 900 in the formula +C3*F4/900). Finally, the data section stores a pointer which points back to the formula result (64-bit IEEE double) in the corresponding in-memory cell record; use of this pointer is described below.

Following the data section in the compiled formula is the compiled code proper. This comprises the literal native machine language sequence which is to be executed by the target processor/coprocessor. The pointer-to-compiled formula (pCF) points here. The compiled code itself stores memory-address operands which point back to the cell addresses and/or constants stored in the data section. The compile code concludes by executing a jump instruction to a Helper Function in the near library which stores the result of the Compiled Formula and exits (i.e., returns control back to the Formula Evaluator).

FIG. 8 illustrates the construction and layout of a code segment storing compiled formulas in greater detail. At offset 0000 in the code segment, the near library 801 of Helper Functions is stored. An exemplary embodiment of the present invention includes a PUSH_VALUE function and a STORE_AND_EXIT function. The operation of each of these is described in further detail hereinbelow.

Following the near library is the first compiled formula 810. The exact layout of compiled formulas will be illustrated using the example of +C3*F4/900 stored in the Cell B1. The Compiled Formula$_1$ (810) includes a data section 811 and a compiled code section 813. The data section 811 stores cell references and/or values which appear in the formula. For the example at hand (i.e., C3*F4/900), the following cells and/or data members are present: C3, F4, and 900. Accordingly, the data section 811 stores pointers to cells C3 and F4, and stores the literal constant of 900. Finally, the data section 811 stores a pointer which points back to the formula result (64-bit double) of the cell record.

The compiled code for the formula is stored in the compiled code section 813, which begins at offset 026F; thus the pointer-to-compiled formula (pCF) for the cell B1 points to here. An exemplary machine language sequence for the formula of the present example is as follows. First, a pointer to C3's record is loaded into a processor register:

MOV BX, 0261

This serves as a parameter to the PUSH_VALUE function. Next, the routine calls (near call) to the PUSH_VALUE Helper Function:

CALL PUSH_VALUE

In an exemplary embodiment, the PUSH_VALUE function operates to push the value for the cell (here, cell C3) onto the top of the coprocessor's stack. The PUSH_VALUE function may accomplish this by the following steps (shown in pseudocode format):

---
Procedure: Push Value
   load pointer to cell body of value referenced
   check the data type of the cell
      for a blank cell push 0
      for a string value push 0
      for an integer push it on the floating point units floating point number stack
      for a formula result or fractional double value push the double
---

At the conclusion of the PUSH_VALUE routine, an appropriate value for the cell (C3) has been pushed on the top of the coprocessor's stack.

The compiled code routine proceeds in a similar manner to load the value of the F4 cell (by loading its pointer and pushing the pointed to value):

MOV BX, 0265

CALL PUSH_VALUE

Now, values for C3 and F4 have been stored on the stack. Next, the two top coprocessor registers are multiplied together, thus multiplying the value of C3 by F4:

FMULT ST(1), ST

This leaves the value of C3*F4 on the top of the stack.

The compiled code routine next proceeds to load the address of the literal value in the formula (900) in a processor register:

MOV BX, 0269 and then loads the pointed-to value into the coprocessor stack:

FILD CS:WORD PTR[BX]

The value (i.e., 900 or 0269h) is now on top of the coprocessor stack.

Now, a floating-point division instruction may be executed for dividing C3*F4 (stored on the stack) by the value of 900:

FDIVP ST(1), ST

The result of the formula is now on the top of the stack.

The routine moves the pointer-to-formula result into a processor register:

MOV BX, 026B and executes a jump to the STORE_AND_EXIT near function, for storing the result back out to the cell record:

JMP STORE_AND_EXIT

The STORE_AND_EXIT function serves to store the result back out to the cell record, performing any necessary conversion (e.g., converting to ERR). This may be accomplished by the following steps (again shown in pseudocode format):

---
Procedure: Store and Exit
   load pointer to formulas value from table using offset provided as a parameter
   store value from floating point unit as a double
   check floating point unit status for:
      overflow, divide by zero and invalid operation
      if no error detected, then exit
      else assign a code and copy the cell coordinate to the matissa area of the double
         for all errors assign 0 to the sign bit, 07FFh to the exponent and:
            for invalid operation assign 0Fh to the MSB's of the mantissa value
            for overflow assign 0Eh to the MSB's of the mantissa value
            for divide by zero assign 0Dh to the MSB's of the mantissa value
         and copy the formula cell coordinate to the LSB's of the mantissa
            finally clear the exception state in the floating point unit
---

At the conclusion of the routine an appropriate result for the formula has been stored back out to the cell record and control has returned to the Formula Evaluator, which may then proceed to evaluation of the next (compiled or uncompiled) formula.

Attached hereto is an Appendix containing ASM source code listings providing a description of Helper Functions of the present invention, suitable for use in a general purpose digital computer system such as an IBM-compatible personal computer with an Intel 80×87-class FPU. A suitable assembler for compiling the code is available from several vendors, including Borland International of Scotts Valley, Calif.

While the invention is described in some detail with specific reference to a single preferred embodiment and certain alternatives, there is no intent to limit the invention to that particular embodiment or those specific alternatives. Although an exemplary embodiment using an Intel 80×87-class FPU is described, for instance, those skilled in the art will appreciate that other IEEE-compliant FPUs may be employed. Thus, the true scope of the present invention is not limited to any one of the foregoing exemplary embodiments but is instead defined by the appended claims.

| APPENDIX: Helper Functions for Intel Architecture | | |
|---|---|---|
| ; Helper Functions stored as near library | | |
| ; Copyright © 1994 Borland International | | |
| PUSHVALUE: | LES | BX, CS:[BX]   ; load segment offset |
| | TEST | ES:BYTE PTR[BX], 01 |
| | JE | PV1 ; load 0 |
| | LES | BX:ES:[BX] |
| | TEST | ES:BYTE PTR[BX–01], 06 |
| | JE | PVZ |
| | CMP | ES:WORD PTR[BX+07], 7FF8 |
| | JE | PVZ |
| | FLD | ES:QWORD PTR[BX+01] |
| | RET | |
| PV1: | FLDZ | |
| | RET | |
| PVZ: | FILD | ES:WORD PTR[BX+02] |
| | RET | |
| STORE_AND_EXIT: | | |
| | LES | BX, CS:[BX]   ; load ptr to formula result |
| | FSTP | ES:QWORD PTR[BX] ; pop result |
| | FNSTSW | AX         ; dump status word |
| | AND | AL, 0Dh   ; check bits 0, 2, 3 |
| | JNE | SE_EXCEPT |
| | RETF | |
| SE_EXCEPT: | MOV | DX, 7FFFh   ;     ERR bit pattern |
| | TEST | AL, 01h    ;    Test status word for exceptions |
| | JNE | SE_EX1 |
| | DEC | DL |
| | TEST | AL, 08h |
| | JNE | SE_EX1 |
| | DEC | DL |
| SE_EX1: | CALL | SE_WRITE_EXCEPT |
| | WAIT | |
| | FNCLEX | |
| | RETF | |
| SE_WRITE_EXCEPT: | | ; Write special values to formula double |
| | MOV | EAX, ES:[BX+08] |
| | MOV | ES:[BX], EAX |
| | MOV | AX, ES:[BX+0Ch] |
| | MOV | ES:[BX+04], AX |
| | MOV | ES:[BX+06], DX   ;    Note DX value |
| | RET | |

What is claimed is:

1. In an electronic spreadsheet system for modeling user-specified information in a spreadsheet model, said spreadsheet model comprising a plurality of cells storing formulas and values calculated from said formulas, a computer-implemented method for recalculating the spreadsheet model, the computer-implemented method comprising:

(a) receiving input specifying a formula for a particular cell;

(b) converting said input into a sequence comprising operand and operator tokens, at least one of said operand tokens comprising a cell identifier for referencing a value stored in another cell;

(c) for each cell identifier in step (b) which references a value stored in another cell, determining a memory address where the value for the cell is stored in system memory;

(d) compiling said formula for the particular cell into a machine language sequence for execution by a target processor, said machine language sequence including said memory address for each cell identifier in step (b) which references a value stored in another cell;

(e) storing in system memory the machine language sequence for the particular cell; and (f) recalculating the spreadsheet model by executing said machine language sequence stored in system memory.

2. The computer-implemented method of claim 1, further comprising:

(g) recalculating the spreadsheet model a plurality of times, by repeating step (f) for each time.

3. The computer-implemented method of claim 2, further comprising:

setting a flag for indicating invalidation or memory addresses determined in step (c); and if said flag is set, repeating steps (c) and (d) before performing the recalculating step (f).

4. The computer-implemented method of claim 3, wherein said flag is set to invalid when an operation affecting memory allocation for cells has occurred.

5. The computer-implemented method of claim 4, wherein said operation affecting memory allocation for cells includes user-directed operations for inserting and deleting desired ones of spreadsheet rows and columns.

6. The computer-implemented method of claim 1, wherein step (a) comprises:

receiving alphanumeric text from an input device, said alphanumeric text comprising a user-specified formula for a particular cell.

7. The computer-implemented method of claim 1, wherein said step (d) includes:

compiling said formula for the particular cell into a machine language sequence for execution by a target processor which includes an IEEE-compliant, stack-based floating-point processing unit.

8. The computer-implemented method of claim 7, wherein the spreadsheet system represents an error in a value as a spreadsheet ERR ("error") value and represents unavailability of value as a spreadsheet NA ("not available") value, wherein said processor represents a value which is not a number as an IEEE-compliant NaN ("Not-a-Number") value, and wherein said computer-implemented method further comprises:

representing in said processor spreadsheet ERR and NA values as IEEE-compliant NaN values, so that said processor propagates spreadsheet ERR and NA values to appropriate dependent cells during recalculation.

9. The computer-implemented method of claim 8, wherein NaN values representing spreadsheet ERR values have a greater mantissa value than NaN values representing spreadsheet NA values, so that the processor propagates a spreadsheet ERR value during processor operations which combine an ERR value with an NA value.

10. The computer-implemented method of claim 8, wherein each of said NaN values representing spreadsheet ERR and NA values includes an embedded cell address for indicating a particular cell location where the value in the spreadsheet model originated.

11. In an electronic spreadsheet system having a spreadsheet comprising a plurality of information cells for storing user-supplied data and formulas operative on said data, a computer-implemented method for compiling a formula into native machine code for execution by a floating-point unit of a computer, the computer-implemented method comprising:

(a) loading a spreadsheet of said information cells into a main memory of the computer, said spreadsheet storing at least one formula as a sequence of operand and operator tokens; and (b) scanning said sequence of tokens for:
   (i) creating a reference list which stores a pointer for each of said operand tokens which references a value of an information cell and which stores a literal value for each of said operand tokens which comprises a constant, and
   (ii) generating a sequence of machine code instructions which invokes operations of the floating-point unit for evaluating the formula, said sequence of machine code instructions including pointers pointing to locations in said reference list, for retrieving cell values for said operand tokens which comprises an identifier for an information cell and for retrieving literal values for said operand tokens which comprises constant values.

12. The computer-implemented method of claim 11, wherein step (b) further comprises:

storing in the main memory said sequence of machine code instructions together with said reference list, so that recalculation operations of the spreadsheet are performed by direct execution of said sequence of machine code instructions by the floating-point unit.

13. In an electronic spreadsheet system, a computer-implemented method for improving recalculation of spreadsheet formulas in a spreadsheet model, the computer-implemented method comprising:

(a) maintaining the spreadsheet model as a plurality of cell records on a storage device, wherein each cell record stores user-supplied data for a single information cell and includes a cell identifier which specifies a particular location in said spreadsheet model for the cell, and wherein some of said cell records store spreadsheet formulas having cell identifiers for referencing values of other cells in the spreadsheet model;

(b) loading said cell records into an addressable memory device for evaluation by a processing unit, wherein each cell record of the spreadsheet model resides at a particular memory address in said memory device;

(c) for each cell record storing a spreadsheet formula:
   (i) creating a reference list for retrieving from the memory device values of cells whose identifiers are present in the formula, and for retrieving values of any constant values present in the formula,
   (ii) generating a compiled formula comprising a sequence of native machine code which is directly executable by a floating-point processor, said sequence comprising operations of said floating-point processor which calculates a result for the formula, said sequence of native machine code including instructions for retrieving from the memory device, based on the reference list, any values referenced in the formula,
   (iii) storing said compiled formula at a location in said memory device, and
   (iv) storing in the cell record a pointer to the location in the memory device of the compiled formula; and (d) recalculating spreadsheet formulas in the spreadsheet model by executing all stored compiled formulas.

14. The computer-implemented method of claim 13, wherein step (c)(i) includes:

determining a memory address in the memory device for any cell whose value is referenced in the formula.

15. The computer-implemented method of claim 14, wherein said reference list stores as a pointer the memory address for any cell whose value is referenced in the formula.

16. The computer-implemented method of claim 14, further comprising;

storing a validity flag for indicating occurrence of an operation which my affect memory addresses stored in the reference list.

17. The computer-implemented method of claim 13, wherein each said cell identifier comprises information specifying a location of the cell in a matrix of spreadsheet cells.

18. The computer-implemented method of claim 13, wherein native machine code comprises Intel 80×87/80×87-compatible machine code for execution by an Intel 80×87/80×87-compatible processing unit.

19. In an electronic spreadsheet system for modeling user-supplied information in a spreadsheet model, said spreadsheet model comprising a plurality of information cells storing data and formulas operative on said data, a computer-implemented method for recalculating the spreadsheet model, the computer-implemented method comprising:

(a) for each information cell having a formula, storing the formula as a sequence of tokens comprising operands and operators;

(b) for each information cell having a formula, attempting to compile its sequence of tokens into a compiled formula by:
   (i) storing a list specifying a memory address or a literal value for each operand present in the formula,
   (ii) generating a sequence of machine code instructions which, when executed by a floating-point processor, evaluates to a result for the formula, said sequence of machine code instructions referencing said list for retrieving a value for each operand, and (iii) if said sequence of machine code instructions is generated in step (ii), storing said sequence of machine code instructions as the compiled formula for the information cell; and (c) recalculating the spreadsheet model by evaluating said formulas, whereby each information cell having a compiled formula is evaluated by executing its stored sequence of machine code instructions.

20. The computer-implemented method of claim 19, wherein step (a) includes:

storing the formula as a sequence of tokens comprising operands and operators in Reverse-Polish Notation (RPN) format.

21. The computer-implemented method of claim 19, wherein in step (b) the attempt to compile said sequence of tokens into a compiled formula fails if a memory address cannot be determined for an operand in the formula.

22. The computer-implemented method of claim 19, wherein in step (b) the attempt to compile said sequence of tokens into a compiled formula fails if complicated spreadsheet @-functions or transcendental functions are present in the formula.

23. The computer-implemented method of claim 19, wherein in step (b) each information cell not having a stored compiled formula is evaluated by runtime token-based interpretation the stored sequence of tokens for the information cell.

24. The computer-implemented method of claim 19, further comprising:

(d) repeating step (c) for a plurality of spreadsheet recalculations, so that each subsequent recalculation is performed by executing stored machine code instructions for those information cells having stored compiled formulas.

25. The computer-implemented method of claim 19, further comprising:

(d) setting a flag when an operation occurs in the system which invalidates the memory addresses stored in said list; and (e) recalculating the spreadsheet model by:
(i) if said flag is set, repeating steps (b) and (c) and resetting said flag, and
(ii) if said flag is not set, repeating step (c).

26. An electronic spreadsheet system for modeling user data in a spreadsheet model comprising a matrix of cells, the system comprising:

a computer having a central processor, a floating-point processor, a system memory, and a storage device;

means for storing said spreadsheet model as a plurality of cell records on said storage device;

means for loading said spreadsheet model into memory by transferring said cell records from said storage device into said system memory, wherein each cell record resides at a particular memory address in the system memory;

input means for receiving input specifying a spreadsheet formula for a particular cell;

means for storing said input as a sequence of tokens for the particular cell, said sequence comprising operand and operator tokens;

means for compiling said sequence of tokens for the particular cell into a compiled formula comprising machine code instructions for execution by said central processor and said floating-point processor; and means for recalculating a result for said particular cell by executing said machine code instructions of the compiled formula.

27. The system of claim 26, wherein said floating-point processor supports IEEE Standard for Floating-point Arithmetic.

28. The system of claim 26, wherein said central processor comprises an Intel 80×86-class microprocessor, and wherein said floating-point processor comprises an Intel 80×87-class math coprocessor.

29. The system of claim 28, wherein said machine code instructions comprise Intel native machine code instructions for directing operation of an Intel 80×86-class microprocessor operating in tandem with an Intel 80×87-class math coprocessor.

30. An electronic spreadsheet system for modeling information in a matrix of spreadsheet cells, said electronic spreadsheet system comprising:

a computer having a processing unit and a system memory, said spreadsheet cells storing in said system memory user data and spreadsheet formulas operative on said user data; and a formula evaluator system, operably coupled to said computer, comprising:

means for instructing paid processing unit for converting each spreadsheet formula into opcode tokens for runtime interpretation by a token-based formula interpreter;

means for instructing said processing unit for compiling opcode tokens for some of said spreadsheet formulas into a series of machine code instructions for execution by said processing unit;

means for instructing said processing unit for storing said series of machine code instructions as compiled formulas for particular spreadsheet cells; and recalculation means for instructing said processing unit for evaluating said spreadsheet formulas by interpreting opcode tokens for each cell which does not have a compiled formula and by executing said series of machine code instructions for each cell which does have a compiled formula.

31. The system of claim 30, further comprising:

input means for receiving character input specifying a spreadsheet formula for a cell.

32. The system of claim 30, wherein some of said spreadsheet formulas include references to values stored in other cells, and wherein said means for storing said series of machine code instructions as compiled formulas further comprises means for storing a memory address for each cell whose value is referenced in a compiled formula.

* * * * *

UNITED STATES PATENT AND TRADEMARK OFFICE
CERTIFICATE OF CORRECTION

PATENT NO. : 5,471,612
DATED : November 28, 1995
INVENTOR(S) : Schlafly

It is certified that error appears in the above-indentified patent and that said Letters Patent is hereby corrected as shown below:

On the title page delete item [73] Assignee: Borland International, Inc., Scotts Valley, Calif.

Signed and Sealed this

Fourth Day of June, 1996

Attest:

BRUCE LEHMAN

*Attesting Officer*          *Commissioner of Patents and Trademarks*